US005479447A

United States Patent [19]
Chow et al.

[11] Patent Number: 5,479,447
[45] Date of Patent: Dec. 26, 1995

[54] METHOD AND APPARATUS FOR ADAPTIVE, VARIABLE BANDWIDTH, HIGH-SPEED DATA TRANSMISSION OF A MULTICARRIER SIGNAL OVER DIGITAL SUBSCRIBER LINES

[75] Inventors: Peter S. Chow, Redwood City; John M. Cioffi, Cupertino, both of Calif.

[73] Assignee: The Board of Trustees of the Leland Stanford, Junior University, Stanford, Calif.

[21] Appl. No.: 57,301

[22] Filed: May 3, 1993

[51] Int. Cl.$^6$ ............................... H04K 1/10; H04L 27/28
[52] U.S. Cl. ........................ 375/260; 375/377; 370/118
[58] Field of Search ............................. 375/38, 8, 10, 375/121, 122, 109, 260, 222, 246, 377, 240, 358, 242, 241; 379/93; 455/266; 370/118, 70, 94.1; 381/29, 30

[56] References Cited

U.S. PATENT DOCUMENTS

| | | | |
|---|---|---|---|
| 4,535,472 | 8/1985 | Tomcik | 375/122 |
| 4,731,816 | 3/1988 | Hughes-Mortogs | 379/98 |
| 4,757,495 | 7/1988 | Decker et al. | 370/70 |
| 4,899,384 | 2/1990 | Crouse et al. | 375/122 X |
| 4,980,897 | 12/1990 | Decker et al. | 375/38 |
| 5,268,685 | 12/1993 | Fujiwara | 381/30 |
| 5,285,476 | 2/1994 | Akagiri et al. | 375/122 X |
| 5,313,467 | 5/1994 | Varghese et al. | 370/94.1 |

OTHER PUBLICATIONS

"principle of Communication Engineering" Wozencraft et al, John Wiley & Sons, 1976, pp. 286–357.

*Primary Examiner*—Stephen Chin
*Assistant Examiner*—Tesfaldet Bocure
*Attorney, Agent, or Firm*—Claude A. S. Hamrick

[57] ABSTRACT

A method and apparatus for adaptive, variable bandwidth, high-speed data transmission of a multicarrier signal over digital subscriber lines wherein the initial optimal transmission bandwidth is identified based on initial signal-to-noise ratio (SNR) estimates of the orthogonal carriers of the multicarrier system. Maximum data throughput, or system performance margin, is achieved by assigning the total amount of information, or number of bits, to be transmitted in each multicarrier symbol to particular carriers through an initial bit allocation procedure, which is possibly subject to variable target bit error rates among the carriers. A transmit power mask, of any shape and level, is imposed upon the system by an initial energy allocation procedure that limits the maximum amount of power to be transmitted in each of the several carriers. Lastly, run-time adaptivity is achieved by monitoring the mean-squared-errors (MSE) of the orthogonal carriers, and the transmission bandwidth, as well as the bit allocation within the multicarrier symbol, is caused to change in real-time corresponding to changes in the channel characteristics in order to maintain optimal system performance.

35 Claims, 12 Drawing Sheets

METHOD AND APPARATUS FOR ADAPTIVE, VARIABLE BANDWIDTH, HIGH-SPEED DATA TRANSMISSION OF A MULTICARRIER SIGNAL OVER DIGITAL SUBSCRIBER LINES

FIELD OF THE INVENTION

The present invention relates to systems for the continuous Transmission and reception of multicarrier, high-speed data signals over Digital Subscriber Lines, and more particularly, to a method and apparatus for accomplishing real-time, adaptive bandwidth optimization, with an arbitrary transmit power mask, of a transmitted multicarrier, high-speed data signal over Digital Subscriber Lines.

BACKGROUND OF THE INVENTION

A basic multicarrier transmitter and a corresponding multicarrier receiver as known in the prior art are shown in FIG. 1 of the drawing. Transmitter 10 includes a serial-to-parallel converter 14, a multicarrier modulator 16, and a pretransmit processor 18. Receiver 12 includes a post channel processor 20, a multicarrier demodulator 22, and a parallel-to-serial converter 24. The transmitter and receiver are linked by a digital subscriber line (DSL) or other form of communication channel 26. Serial input data at a rate of $b_{total}/T$ bits per second are grouped by converter 14 into blocks of $b_{total}$ bits for each multicarrier symbol, with a symbol period of T. The $b_{total}$ bits in each multicarrier symbol are modulated in modulator 16 by N separate carriers with $b_i$ bits modulated by the $i^{-th}$ carrier. The preferred embodiment uses an Inverse Fast Fourier Transform (IFFT) during modulation to generate $N_s$ time-domain samples of a transmit signal for each block of $b_{total}$ bits, where $N_s$ is preferably equal to 2N. The corresponding multicarrier demodulator performs a Fast Fourier Transform (FFT), where $b_i$ bits are recovered from the $i^{-th}$ carrier. This particular embodiment of multicarrier modulation is known as the Discrete Multitone (DMT) modulation, and, as depicted in FIG. 2, the carriers in a DMT system are spaced 1/T HZ apart across the lower N/T Hz of the frequency band. More detailed discussion of the principles of multicarrier transmission and reception in general is given by J. A. C. Bingham in "Multicarrier Modulation for Data Transmission: An Idea Whose Time Has Come", *IEEE Communications Magazine*, Volume 28, Number 5, pp. 5–14, May 1990; and by A. Ruiz et al. in "Discrete Multiple Tone Modulation with Coset Coding for the Spectrally Shaped Channel", *IEEE Transactions on Communications*, Volume 40, Number 6, pp. 1012–1029, Jun. 1992.

Discrete Multitone Modulation

The general structure of a DMT system is illustrated in FIG. 3, where $\{X_0, X_1, \ldots, X_{N-1}\}$ are the original, complex, input data symbols, $\{x_k\}$ is the modulated data sequence (before cyclic prefix), $\{h_k\}$ is the discrete-time channel response, $\{n_k\}$ is the additive noise sequence, $\{y_k\}$ is the received sequence (after the removal of cyclic prefix), and $\{\tilde{x}_0, \tilde{x}_1, \ldots, \tilde{x}_{N-1}\}$ are the decoded, complex data symbols. The $p_i$'s and $p_i^*$'s in FIG. 3 are known as the modulating and the demodulating vectors, and preferably they are chosen to be orthonormal. Therefore, for a discrete-time system, the following condition should be satisfied:

$$p_i \odot p_j^* = \delta_{ij}, \tag{1}$$

where $\odot$ denotes the dot product of two vectors and the "$\delta$-function" is defined as $$\delta_{ij} = \begin{cases} 1 & i=j \\ 0 & i \neq j \end{cases} \tag{2}$$

For the DMT system, the independent modulating and demodulating vectors in FIG. 3 are the IDFT and the DFT vectors, given by the following pair of relationships:

$$X_m = \frac{1}{\sqrt{2N}} \sum_{n=0}^{2N-1} x_n e^{\frac{-j2\pi nm}{2N}} \tag{3}$$

$$x_m = \frac{1}{\sqrt{2N}} \sum_{n=0}^{2N-1} X_n e^{\frac{j2\pi nm}{2N}} \tag{4}$$

A DMT system with N complex subchannels in the frequency domain requires a DFT size of 2N, and the forced conjugate symmetry in the frequency domain will result in the desired real-valued time domain samples. In the preferred embodiment, IDFT and DFT are implemented with the well known IFFT and FFT algorithms. The cyclic prefix is a discrete-time technique (illustrated in FIG. 4) used to eliminate interblock interference (IBI) in the DMT system. More detailed treatments of the cyclic prefix and other finite block length DMT system implementational issues are given by J. S. Chow et al. in "A Discrete Multitone Transceiver System for HDSL Applications", *IEEE Journal on Selected Areas in Communications*, Volume 9, Number 6, pp. 895–908, Aug. 1991; "Equalizer Training Algorithms for Multicarrier Modulation Systems", 1993 *IEEE International Conference on Communications*, Geneva, Switzerland, May 1993; and "Method for Equalizing a Multicarrier Signal in a Multicarrier Communication System", U.S. patent application Ser. No. 07/898,104 filed Jun. 1992, issued on Feb. 8, 1994 as U.S. Pat. No. 5,285,474, and assigned to the assignee of the present invention.

FIG. 5a is a block diagram illustrating a communication system including a Central Office Transceiver 27 and a Customer Premises Transceiver linked together by a Duplex Channel 29. Each transceiver includes a transmitter 30 and a receiver 32 that communicates with each other through an operations channel, and each transmitter is linked with a corresponding receiver by a communications channel 34.

FIG. 5b is a more detailed block diagram showing the principal operative components of a basic DMT transmitter 30 and a basic DMT receiver 32 connected through a channel 34. Serial input data are grouped into blocks, converted to a parallel form, and appropriately encoded by an encoder 36. Parallel outputs of the encoder are modulated by an IFFT operation at 38 and converted back to a serial data stream by a converter 40. The digital modulated data stream is cyclically prefixed, converted to analog form by a digital-to-analog converter (DAC) 42, low-pass filtered at 44, and passed through a D.C. isolating transformer 46 during pre-transmit processing to produce an analog transmit signal that is the input to the transmission channel 34.

At the receiver end, the received analog signal is passed through a D.C. isolating transformer and low-pass filter 48, converted to digital form by an analog-to-digital converter (ADC) 50, time domain pre-equalized by a finite impulse response (FIR) filter 52 to limit the effective memory of the channel, and stripped of the cyclic prefix during post-receive processing in converter 54. The resulting digital signals are demodulated by an FFT operation 56 and converted to parallel frequency domain signals. Since the amplitude vs. frequency and the delay vs. frequency responses of the channel are not necessarily constant across the entire used frequency band, the received signal will differ from the transmitted signal, and the parallel inputs to the decoder 58 will differ from those parallel outputs from the encoder 36. A simple form of equalization used to compensate these differences is a frequency domain equalizer (FEQ), which individually adjusts for the attenuation and delay of each of the carriers immediately before the parallel frequency domain signals are passed to the decoder. A one-tap FEQ and decision element is depicted in FIG. 6. Lastly, the frequency domain equalized signals are appropriately decoded and converted back to a serial form by the decoder. Ideally, the detected output serial data from the decoder 58 will be identical to the input serial data to the encoder 36.

Bandwidth Optimization

Due to the dispersive nature of twisted copper pairs, severe channel attenuation as well as intersymbol interference (ISI) are unavoidable in Digital Subscriber Line (DSL) applications. To mitigate the effects of ISI, some sophisticated form of equalization is necessary. Furthermore, the DSL environment consists of a wide variety of loop configurations; as a result, the optimal transmission bandwidth of one particular line may be grossly mismatched to that of another line. To insure best performance, it is then necessary to optimize the transmission bandwidth on a line-by-line basis.

In a conventional single-carrier digital transmission system, such as a Quadrature Amplitude Modulation (QAM) system, implemented with an equalizer or a precoder, the transmission bandwidth is determined by the symbol rate and the carrier frequency of the system. Unfortunately, variable symbol rate, single-carrier systems are still impractical to implement from a complexity standpoint with today's technology, and even if they are implemented, the granularity of possible symbol rates are typically very coarse. This is a direct consequence of the fact that for a fixed data rate, the symbol rate can only change in discrete multiples of $b_{symbol}/(b_{symbol} \pm 1)$, where $b_{symbol}$ is the number of bits transmitted by each data symbol, provided that only signal constellations with integer numbers of bits are used.

Multicarrier modulation, however, offers much more flexibility in terms of granularity because it acts on block symbols that consist of a much larger number of bits per symbol over a large number of carriers. Since different numbers of bits can be transmitted through the different carriers (subchannels), the multicarrier transceiver has complete control of the transmission bandwidth usage. As a result, more data will be transmitted through the better carriers and less data will be transmitted through the worse carriers. (See FIG. 7.) In this manner optimal performance can be achieved, in terms of either maximizing total data throughput for a fixed system performance margin or maximizing overall system performance margin for a fixed target data rate, under a fixed aggregate input power constraint and target bit-error-rate.

The maximum number of bits, $b_i$, in a 2-dimensional data symbol (see FIG. 8) that can be supported by the $i^{-th}$ carrier with Signal-to-Noise Ratio (SNR) equal to SNR(i) at a bit-error-rate of $P_e$, a system performance margin of $\gamma_{margin}$, and a total effective coding gain of $\gamma_{eff}$ is approximately given by the following "gap approximation", which is well known in communication theory (See for example, G. D. Forney, Jr. et al, "Combined Equalization and Coding Using Precoding", *IEEE Communications Magazine*, Volume 29, Number 12, pp. 25–34, Dec. 1991):

$$b_i \approx \log_2\left(1 + \frac{SNR(i)}{\Gamma}\right) \text{ (in bits per 2 dimensional symbol).} \quad (5)$$

The "SNR gap", $\Gamma$, in Equation (5) is defined by:

$$\Gamma = \left[Q^{-1}\left(\frac{P_e}{n_e}\right)\right]^2 + \gamma_{margin} - \gamma_{eff} - 4.77 \text{ (in } dB\text{)}, \quad (6)$$

where the Q-function is defined by:

$$Q(x) = \int_x^\infty \frac{1}{\sqrt{2\pi}} e^{\frac{-y^2}{2}} du, \quad (7)$$

so $Q^{-1}(y)$ is the value of x that satisfies the relationship $y=Q(x)$, and $N_e$ is the number of nearest neighbors in the input signal constellation. For a bit-error-rate of $10^{-7}$ which is common in DSL applications, the "gap approximation" reduces to the following:

$$b_i \approx \log_2\left(1 + \frac{SNR(i)}{9.55 \frac{\gamma_{margin}}{\gamma_{eff}}}\right) \text{ (in bits per 2 dimensional symbol).} \quad (8)$$

Equation (8) will be referred to extensively in the Detailed Description of the Preferred Embodiment of the present application.

BRIEF DESCRIPTION OF THE PRIOR ART

Various bandwidth optimization techniques for multicarrier modulation have been proposed for different applications.

Water-Pouring Energy Distribution in The Frequency Domain

The theoretical optimal, or capacity achieving, energy allocation is the well known water-pouring energy distribution. Conceptually, the water-pouring energy distribution is obtained by first inverting the channel SNR curve (FIG. 7) in the frequency domain and then pouring the available energy into the resulting curve. The final "water level" at each particular frequency, or carrier, is the optimal amount of energy to use at that particular frequency, or carrier. The number of bits transmitted by each carrier is then determined by the maximum number of bits that can be supported by each carrier, given the water-pouring energy distribution and the desired bit-error-rate of each carrier. A more detailed discussion of the water-pouring technique is given by R. G. Gallager in the book entitled *Information Theory and Reliable Communication*, Wiley, New York, N.Y., 1968. While the water-pouring technique will yield the optimal bit and energy allocations, therefore the optimal transmission bandwidth, it is typically impractical to implement from a complexity standpoint, especially for DSL applications where impairments, such as severe crosstalk noise, are input power dependent. Furthermore, the water-pouring technique requires a complicated transmit filter for a single-carrier system that is often impractical to implement, and it requires infinite granularity in constellation sizes in a multicarrier system that is difficult to implement.

Hughes-Hartogs Algorithm

A multicarrier bandwidth optimization technique designed for voice-band modem applications, where only constellations with an integer number of bits are used, was invented by D. Hughes-Hartogs and described in "Ensemble Modem Structure for Imperfect Transmission Media", U.S. Pat. Nos. 4,679,227 (Jul. 1987), 4,731,816 (Mar. 1988), and 4,833,706 (May 1989). The basic idea behind Hughes-Hartogs' algorithm is to incrementally add, one bit at a time, the amount of data to be transmitted in each multicarrier symbol until the desired data rate or power constraint is satisfied. Furthermore, this algorithm will always choose the carrier, or subchannel, that requires the least amount of incremental power to support an additional bit at the given desired bit-error-rate. Hughes Hartogs' algorithm, however, is typically too slow in convergence, making it especially unsuitable for DSL applications where the number of carriers and the number of bits to be supported by each multicarrier symbol are both typically much larger than those employed for voice-band modem applications. Also, the channel response, or channel SNR, is assumed to be fixed, i.e., time-invariant after training, in this particular algorithm.

All previous multicarrier bandwidth optimization techniques are performed exclusively during system initialization, when the optimal bit and energy allocations, under a certain set of chosen criteria, are determined. Should the channel characteristics change over time, the line will be dropped, and a redial is necessary to update the system transmission bandwidth to fit new channel characteristics.

SUMMARY OF THE INVENTION

For a practical implementation of a multicarrier communication system for continuous, high-speed data transmission over Digital Subscriber Lines, it is desirable to optimize the performance of the system on a line-by-line basis, subject to a possible constraint on the transmit power spectrum. Accordingly, a principal objective of the present invention is to provide a method and apparatus for calculating the optimal transmission bandwidth during on-line system initialization, subject to an arbitrary transmit power mask and/or variable target bit error rates among the subchannels.

Another objective of the present invention is to provide a method and apparatus that is also real-time adaptive during normal system operation, with continuous data transmission, to compensate for changes in transmission medium characteristics.

In accordance with a presently preferred embodiment of the present invention, the initial optimal transmission bandwidth is identified based on initial signal-to-noise ratio (SNR) estimates of the orthogonal carriers of the multicarrier system. Maximum data throughput, or system performance margin, is achieved by assigning the total amount of information, or number of bits, to be transmitted in each multicarrier symbol to particular carriers through an initial bit allocation procedure, which is possibly subject to variable target bit error rates among the carriers. A transmit power mask, of any shape and level, is imposed upon the system by an initial energy allocation procedure that limits the maximum amount of power to be transmitted in each of the several carriers. Lastly, runtime adaptivity is achieved by monitoring the mean-squared-errors (MSE) of the orthogonal carriers, and the transmission bandwidth, as well as the bit allocation within the multicarrier symbol, is caused to change in real-time corresponding to changes in the channel characteristics in order to maintain optimal system performance.

The present invention has the advantage of not only obtaining an optimal transmission bandwidth, in terms of optimal bit and energy allocations for the carriers during startup, employing a novel technique; but the optimal bit allocation, therefore the transmission bandwidth, is also adaptive during normal, continuous mode of data transmission, in order to maintain optimal performance in the event that the characteristics of the transmission medium is time varying. The concept of using a continuously adaptive transmitter in combination with a continuously adaptive receiver, for quasi-stationary, time-varying transmission channels is believed to be novel. Furthermore, while the present invention is targeted specifically for DSL applications, it can also be used for the transmission of digital multicarrier signals over other transmission environments, such as coaxial cable, optical fiber, and wireless environments, with minor modifications, and it allows for an arbitrary power mask to be placed on the transmitter, in addition to an overall input power constraint, as well as variable target bit error rates among the used subchannels, as part of the bandwidth optimization procedure, which are novel from previous methods.

These and other objectives and advantages of the present invention will no doubt become apparent to those skilled in the art after having read the following detailed description of the preferred embodiment which is illustrated in the several figures of the drawing.

IN THE DRAWING

DETAILED DESCRIPTION OF THE PREFERRED EMBODIMENT

The present invention relates to a method and apparatus for implementing a multicarrier-based transceiver system having continuous adaptive bandwidth optimization. The invention is particularly suited for operation over copper twisted pair conductor channels for Asymmetric Digital Subscriber Line services and various video transmission applications.

Figure 1:
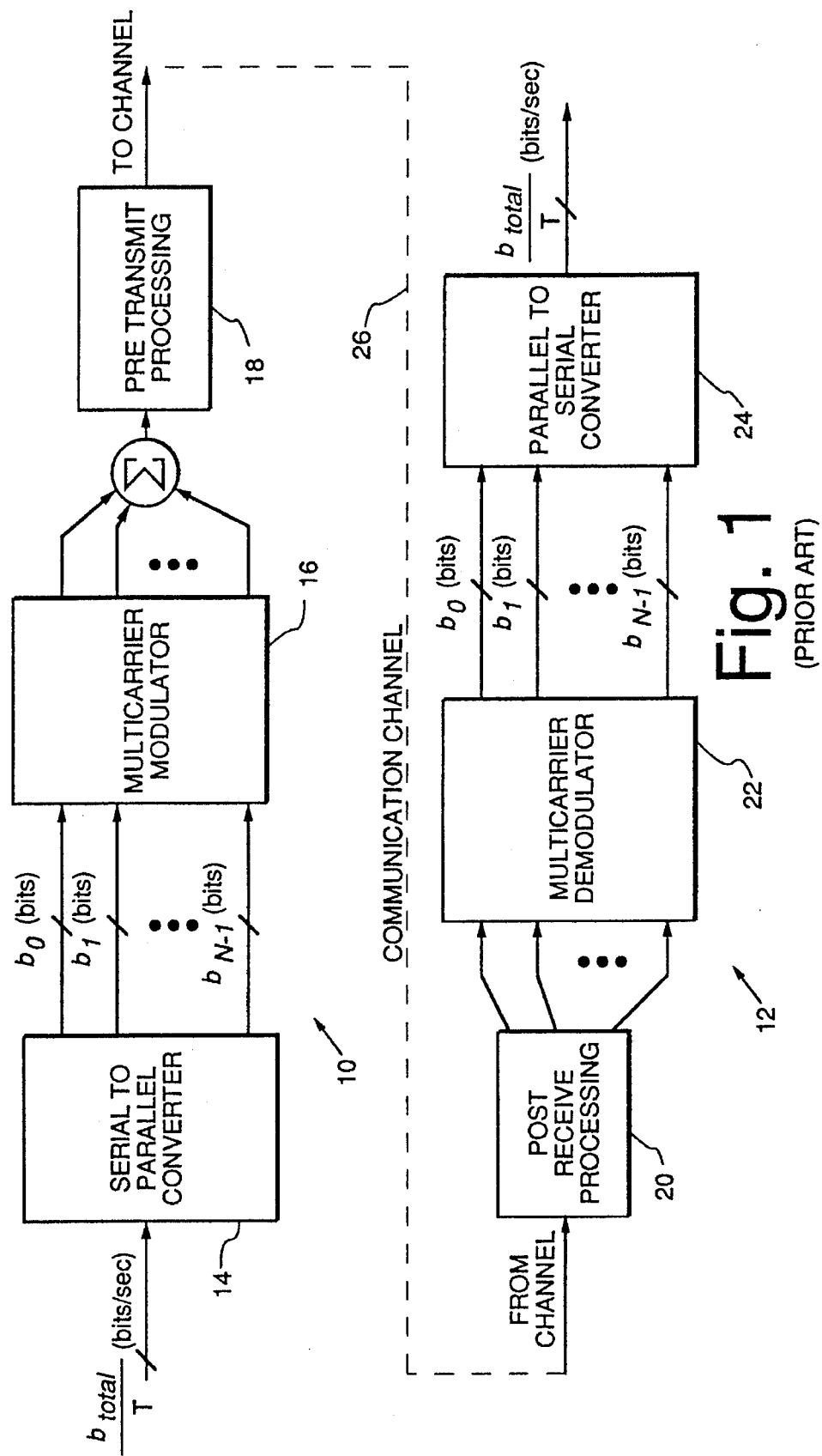
FIG. 1 is a block diagram illustrating a basic prior art multicarrier transmitter, communication channel and receiver.
Figure 2:
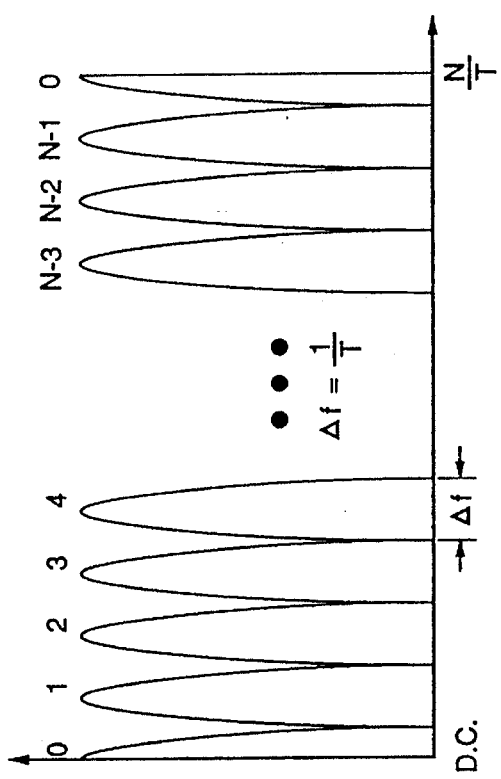
FIG. 2 is a diagram conceptually illustrating frequency domain discrete multitone modulation (DMT)
Figure 3:
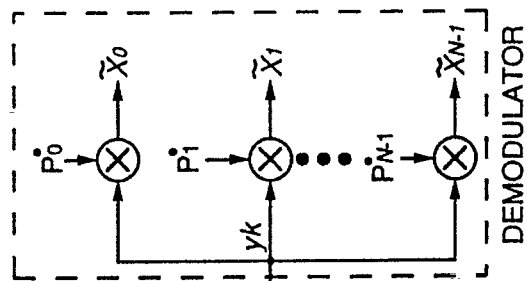
FIG. 3 is a diagram schematically depicting the basic structure of a discrete multitone modulation system.
Figure 3:
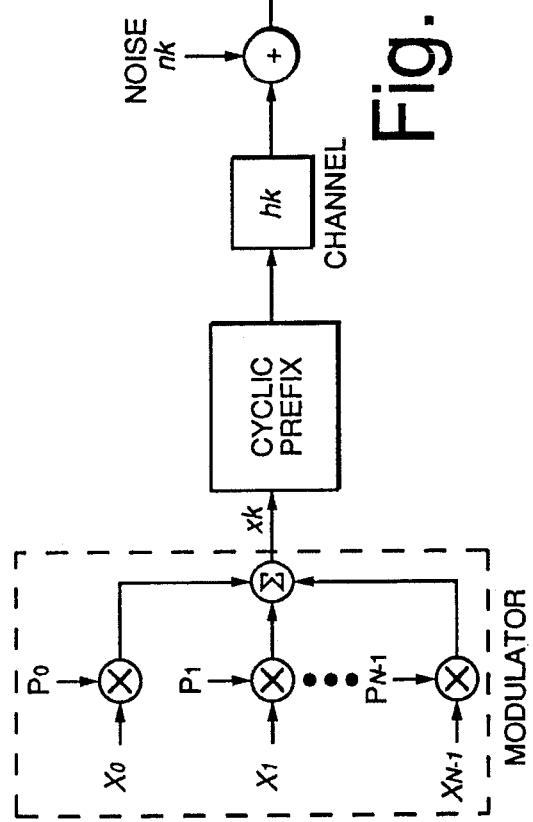
Figure 4:
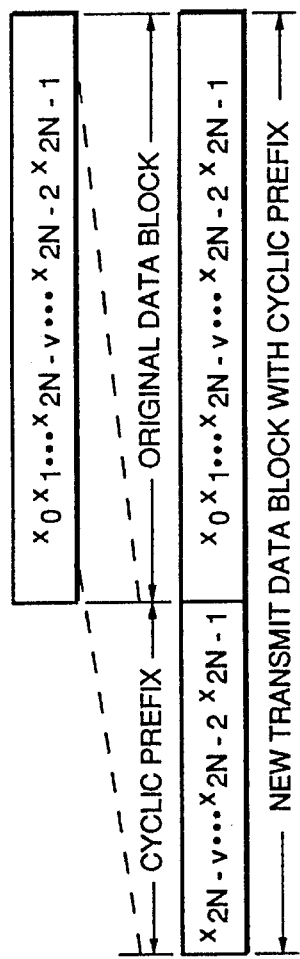
FIG. 4 depicts a block of data including a cyclic prefix.
Figure 5A:
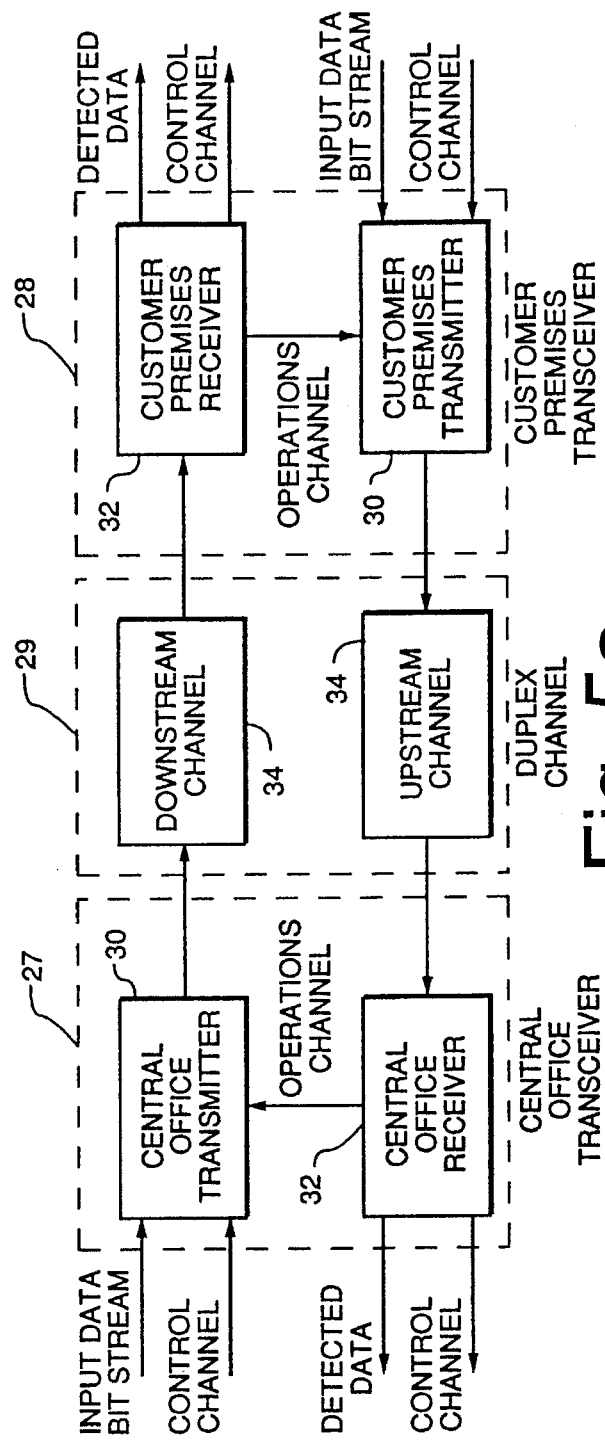
FIGS. 5a and 5b are block diagrams depicting the principal components of a discrete multitone (DMT) modulation communication system.
Figure 5B:
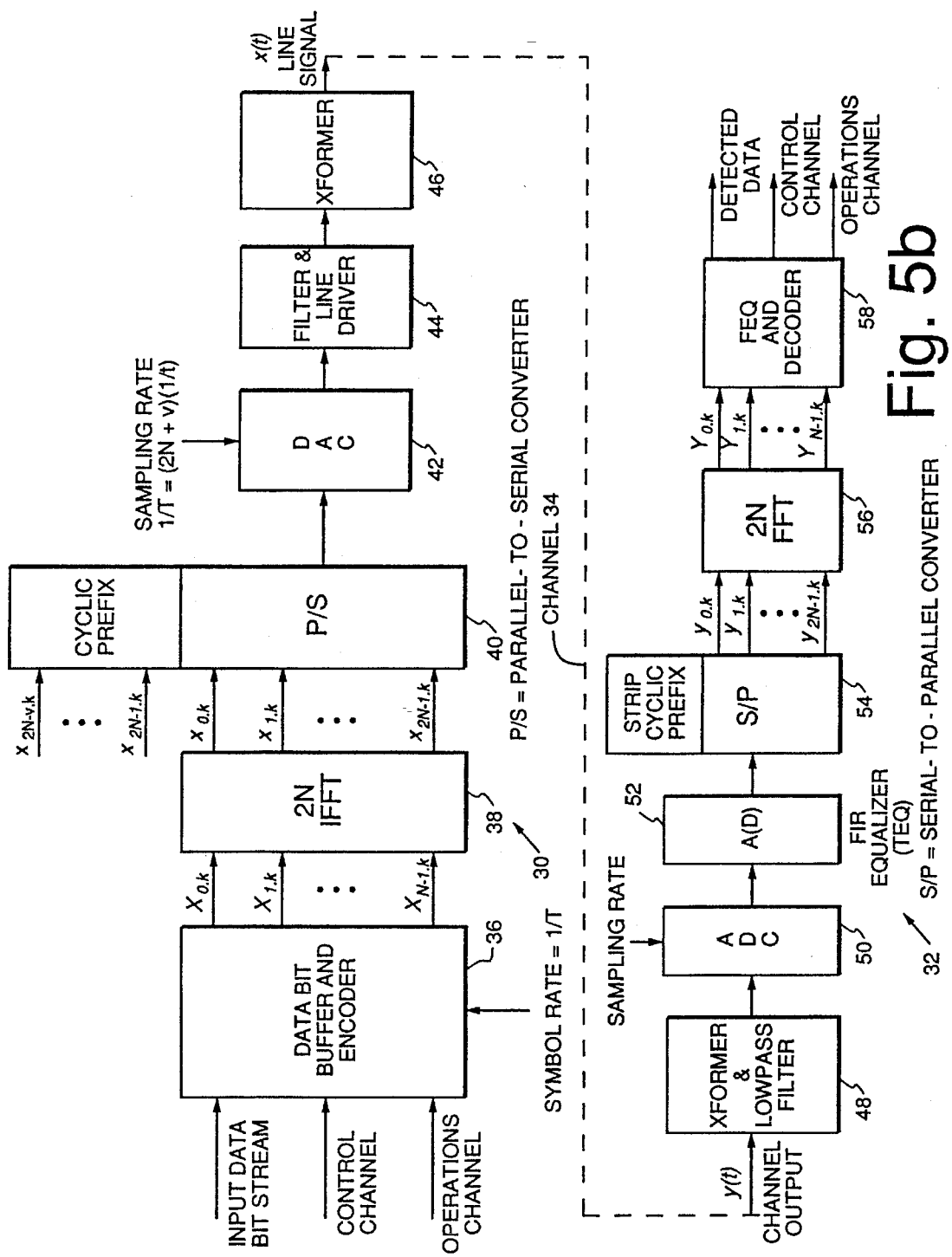

The apparatus used includes a transmitter and receiver that can generally be represented by the block diagram of FIG. 5 with special processing and encoding/decoding software and hardware for implementing the novel interactive and adaptive methods described below. In addition to providing continuous adjustment, as required, of transmission system parameters, it allows the transparent and simultaneous bi-directional communication between transmitter and receiver of control and operations information.

When given a set of initial SNR estimates of the orthogonal carriers of a multicarrier communication system, a set of target bit error rates for the carriers, and an arbitrary transmit power mask together with an overall transmit power constraint, the present invention provides a method of determining the initial bit and energy allocations, and therefore the corresponding transmission bandwidth. The key to determining the initial transmission bandwidth is to calculate the number of carriers to use over sorted carrier SNR's, which will in turn yield the corresponding transmission bandwidth.

The preferred embodiment can be implemented in accordance with one of two methods, depending on the goal of the data transmission system. The first method maximizes the total data throughput rate of the system, given a fixed system performance margin objective and a desired overall bit-error-rate. The second method maximizes the system performance margin, given a target data rate and a desired overall bit-error-rate. The system operates under the additional constraints of integer-bit constellation sizes and a nearly flat on/off energy allocation. The constellation granularity need not be restricted to integer bits, but the implementational complexity will increase with increasing granularity in constellation size.

Figure 9:
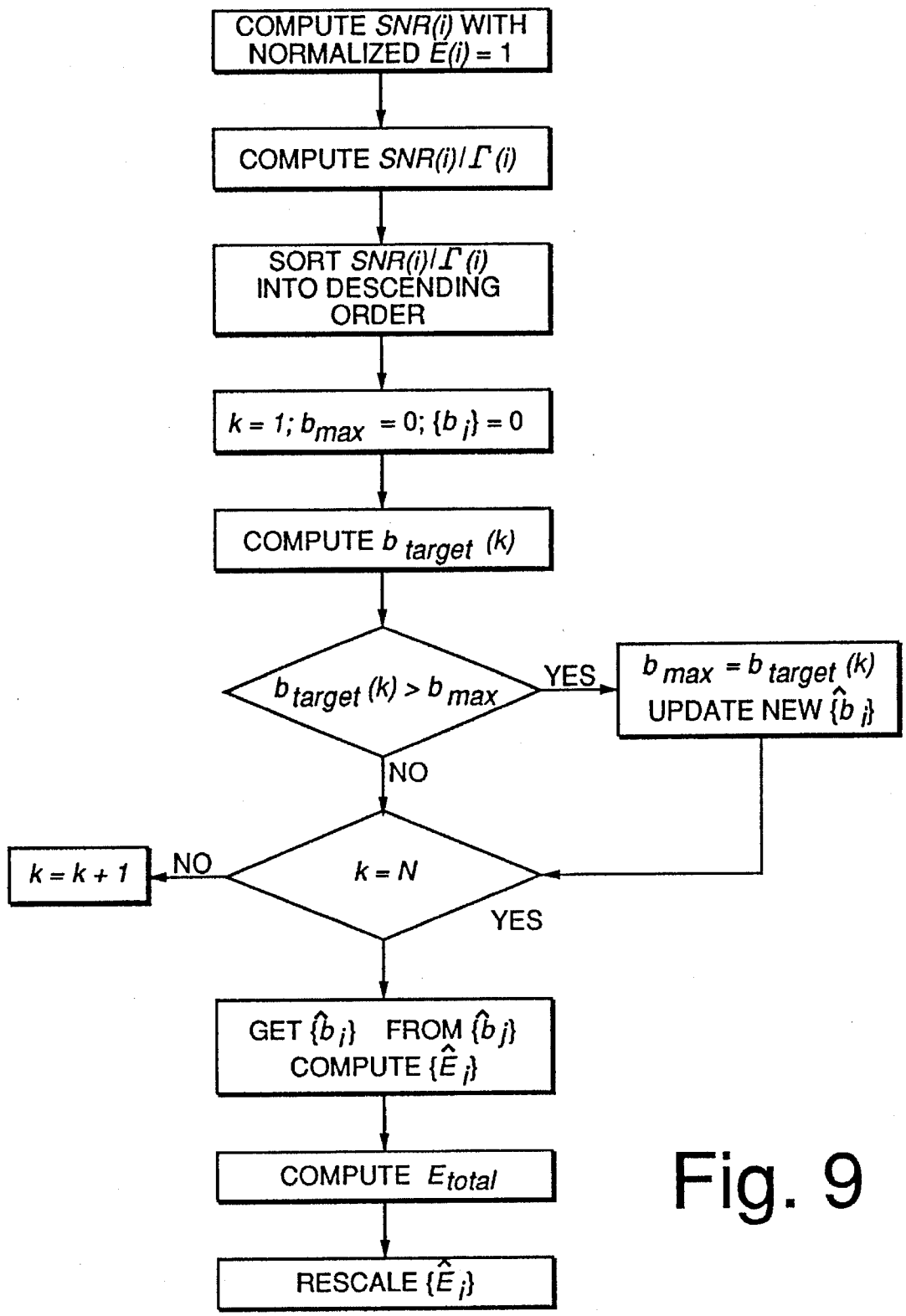
FIG. 9 is a flow chart depicting a total data throughput optimization algorithm in accordance with the present invention.

Algorithmically, the preferred embodiment of the initialization procedure for maximizing total data rate subject to a fixed system performance margin is depicted in the flow chart of FIG. 9 and can be summarized in the following steps:

1. Compute SNR(i)∀i, when all carriers are used and E(i)=1 ∀i, where SNR(i) is the SNR estimate of the $i^{-th}$ carrier at the receiver and E(i) is the transmit energy of the $i^{-th}$ carrier, normalized to 1.

2. Calculate SNR(i)/Γ(i) where Γ(i) is the "SNR gap" (from Equation 6) for the $i^{-th}$ carrier that is determined by the desired bit-error-rate and other chosen system parameters for the $i^{-th}$ carrier.

3. Sort the resulting SNR(i)/Γ(i)'s into descending order and label them so that SNR(j)/Γ(j)≧SNR(j+1)/Γ(j+1) ∀j<N. The mapping from the original carrier labels to the sorted carrier labels is stored and is invertible.

4. Let k=1, $b_{max}$=0, and initialize $\{\hat{b}_j\}$ to all zeros, where k is a count, $b_{max}$ is the current maximum number of bits achievable in a multicarrier symbol, and $\{\hat{b}_j\}$ is the current bit allocation table that achieves $b_{max}$.

5. Compute $b_{target}(k)$ according to:

$$b_{target}(k) = \sum_{j=1}^{k} b_j, \quad (9)$$

where $b_{target}(k)$ is the number of bits achievable in a multicarrier symbol using only the k best carriers, and the number of bits achievable by the $j^{-th}$ carrier $b_j$, is determined by:

$$b_j = \min \left\{ \begin{array}{l} \text{round} \left\{ \log_2 \left( 1 + \frac{\frac{\epsilon_{target}}{k} SNR(j)}{\Gamma(j)} \right) \right\}, \\ \text{floor} \left\{ \log_2 \left( 1 + \frac{\epsilon_{max,j} SNR(j)}{\Gamma(j)} \right) \right\} \end{array} \right. \quad (10)$$

In Equation (10), round{x} is the integer rounding operation; i.e., when the decimal part of x≧0.5, x is rounded up to the next larger integer value by the operation round{x} and when the decimal part of x<0.5, x is rounded down to the next smaller integer value no less than itself by the operation round{x}, floor{x} is the floor operation; i.e., x is always rounded down to the next smaller integer value no less than itself by the operation floor{x}, $E_{target}$ is the total input energy, or power, constraint at the transmitter, k is the number of used carriers, Γ(j) is the "SNR gap" of the chosen system parameters for the $j^{-th}$ carrier, and $E_{max,j}$ is the maximum energy, or power, allowable in the $j^{-th}$ carrier due to the transmit power mask. For each of the k used carriers, an equal amount of transmit energy $E_{target}/k$ is used to calculate the achievable number of bits per multicarrier symbol, but in no event is such energy greater than the allowable amount of individual carrier transmit energy due to the power mask.

6. If $b_{target}(k) > b_{max}$, then set $b_{max}=b_{target}(k)$ and keep track of the current bit allocation table, $\{\hat{b}_j\} = \{b_j\}$, that achieves $b_{max}$.

7. If k≠N, then set k=k+1 and return to step 5, otherwise go to step 8. At this point $b_{max}$ will indicate the maximum achievable data rate, and the currently stored bit allocation table that achieves $b_{max}$, $\{\hat{b}_j\}$ can be used to obtain the initial system bit allocation table, $\{b_i\}$, since the mapping in step 3 is invertible.

8. Allocate input energies, $\{\tilde{E}_i\}$, accordingly so that $P_e(i) = P_{e,i,target}$ ∀i given the bit allocation table $\{b_i\}$, where $P_e(i)$ is the probability of error for the $i^{-th}$ used carrier, and $P_{e,i,target}$ is the target probability of error for the $i^{-th}$ carrier.

9. Calculate the current total transmit energy, $E_{total}$, according to:

$$\epsilon_{total} = \sum_{i=0}^{N-1} \epsilon_i, \quad (11)$$

where $\tilde{E}_i$ is the current transmit energy used by the $i^{-th}$ carrier.

10. Scale the final energy distribution, $\{\tilde{E}_i\}$, according to:

$$\epsilon_i = \min \left\{ \begin{array}{l} \frac{\epsilon_{target}}{\epsilon_{total}} \epsilon_i \\ \epsilon_{max,i} \end{array} \right., \quad (12)$$

The initial bit and energy allocation tables of this system are given by $\{\hat{b}_i\}$ and $\{\tilde{E}_i\}$, respectively.

Figure 10:
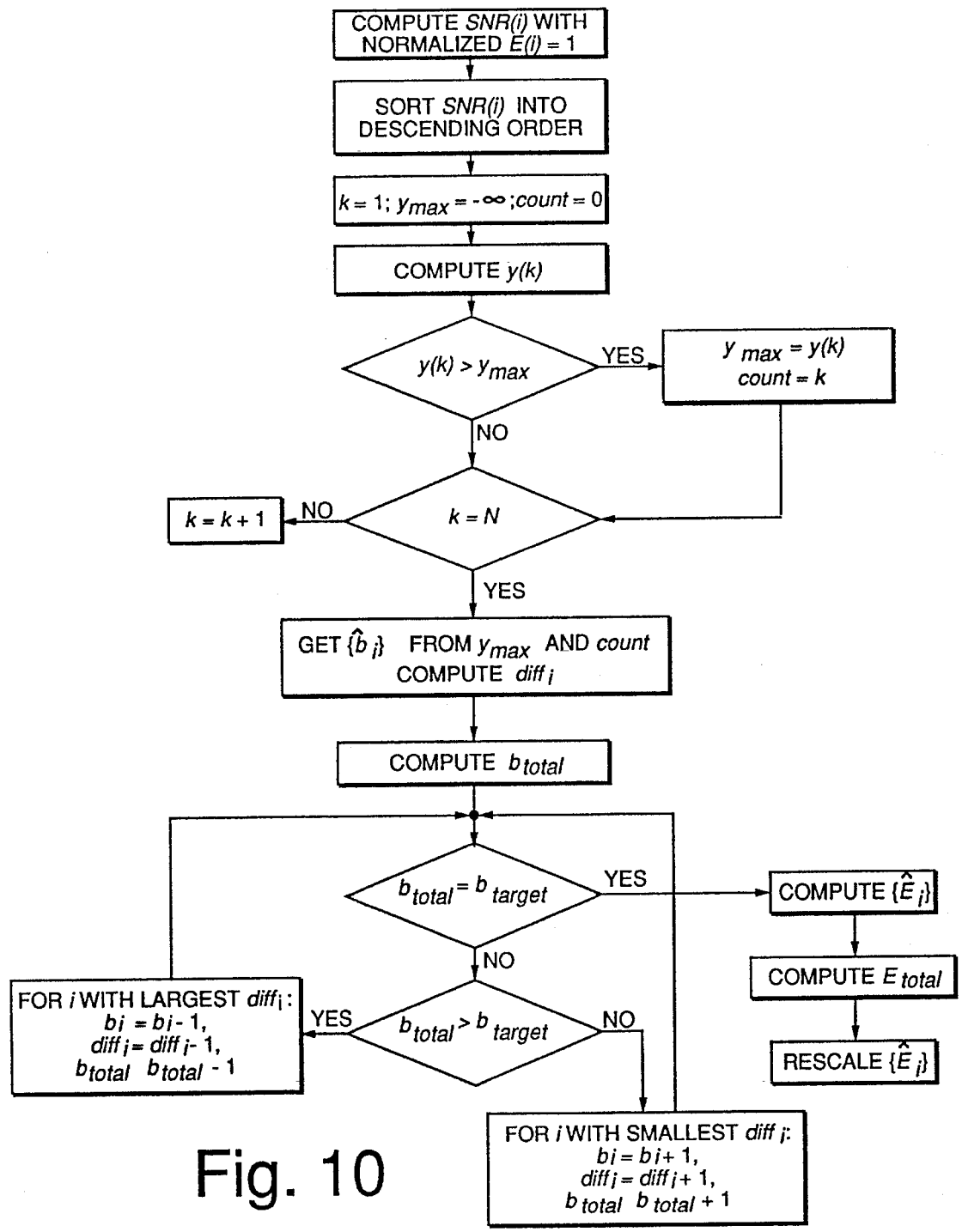
FIG. 10 is a flow chart illustrating a margin optimization algorithm in accordance with the present invention.

Similarly, the preferred embodiment of the initialization procedure for maximizing system performance margin subject to a target data rate is depicted in the flow chart of FIG. 10 and can be summarized in the following steps:

1. Computer SNR(i) ∀i, when all carriers are used and E(i)=1 ∀i, where SNR(i) is the SNR estimate of the $i^{-th}$ carrier at the receiver and E(i) is the transmit energy of the $i^{-th}$ carrier, normalized to 1.

2. Sort the resulting SNR(i)'s into descending order and label them so that SNR(j)≧SNR(j+1) ∀j<N. The mapping from the original carrier labels to the sorted carrier labels is stored and is invertible.

3. Let k=1, $\gamma_{max}=-\infty$, and count=0, where k is a count, $\gamma_{max}$ is the current maximum achievable system performance margin, and count is the number of carriers to use to achieve $\gamma_{max}$.

4. Computer $\gamma(k)$ according to:

$$\gamma(k) = 10 \log_{10} \left( \frac{\overline{SNR(k)}}{2^{\frac{target}{k}} - 1} \right) + \gamma_{eff} - 9.8 (dB) \quad (13)$$

where $\gamma(k)$ is the maximum system performance margin achievable in a multicarrier symbol with a target data rate of $b_{target}$, a total effective coding gain of $\gamma_{eff}$, and a desired bit-error-rate of $10^{-7}$, using only the k best carriers, and the current geometric SNR, $\overline{SNR(k)}$, is calculated as:

$$\overline{SNR(k)} = \left[ \prod_{j=1}^{k} \epsilon_j SNR(j) \right]^{\frac{1}{k}}, \quad (14)$$

where the current transmit energy used by the $j^{-th}$ carrier, $E_j$, is determined by:

$$\epsilon_j = \min \left\{ \begin{array}{l} \frac{\epsilon_{target}}{k} \\ \epsilon_{max,j} \end{array} \right\}, \quad (15)$$

In Equation (15), $E_{target}$ is the total input energy, or power, constraint at the transmitter, k is the number of used carriers, and $E_{maxj}$ is the maximum energy, or power, allowable in the $j^{-th}$ carrier due to the transmit power mask. For each of the k used carriers, an equal amount of transmit energy $E_{target}/k$ is used to calculate the current geometric SNR, $\overline{SNR(k)}$, but in no event is such energy greater than the allowable amount of individual carrier transmit energy due to the power mask.

5. If $\gamma(k) > \gamma_{max}$, then set $\gamma_{max} = \gamma(k)$ and count=k.

6. If k≠N, then set k=k+1 and return to step 4, otherwise go to step 7. At this point $\gamma_{max}$ will indicate the maximum achievable system performance margin given the set of system parameters, and count will be the corresponding number of best carriers to use to achieve $\gamma_{max}$.

7. Calculate the initial bit allocation table, $\{\bar{b}_i\}$, based on $\gamma_{max}$ and count according to:

$$b_j = \min \left\{ \begin{array}{l} \text{round} \left\{ \log_2 \left( 1 + \frac{\frac{\epsilon_{target}}{k} SNR(j)}{\Gamma_{max}} \right) \right\} \\ \text{floor} \left\{ \log_2 \left( 1 + \frac{\epsilon_{max,j} SNR(j)}{\Gamma_{max}} \right) \right\} \end{array} \right\}, \quad (10)$$

for those used carrier determined by count and the invertible mapping of step 2, keep track of the amount of rounding, $\text{diff}_j$, by: (17)

$$\text{diff}_j = \left\{ \begin{array}{ll} \text{diff}_j = 0.5 & \text{if } b_j = \text{floor} \left\{ \log_2 \left( 1 + \frac{\epsilon_{max,j} SNR(j)}{\Gamma_{max}} \right) \right\} \\ b_j - \log_2 \left( 1 + \frac{\frac{\epsilon_{target}}{k} SNR(j)}{\Gamma_{max}} \right) & \text{otherwise} \end{array} \right.$$

and $\Gamma_{max}$ is given by:

$$\Gamma_{max} = \left[ Q^{-1} \left( \frac{P_e}{N_e} \right) \right]^2 + \gamma_{max} - \gamma_{eff} - 4.77 \text{ (in } dB), \quad (18)$$

using $\gamma_{max} = \gamma_{margin}$.

8. Let $B_{total} = \sum_{i=0}^{N-1} \bar{b}_i$, where $B_{total}$ is the total number of bits supported in a multicarrier symbol by the current bit allocation table $\{\bar{b}_i\}$.

9. If $B_{total} > B_{target}$, then subtract one bit at a time from the current bit table, $\{\bar{b}_i\}$, on the carrier that presently has the largest value of $\text{diff}_i$, adjust $\text{diff}_i = \text{diff}_i - 1$ and $B_{total} = B_{total} - 1$ respectively, and repeat until $B_{total} = B_{target}$.

10. If $B_{total} < B_{target}$, then add one bit at a time to the current bit table, $\{\bar{b}_i\}$, on the carrier that presently has the smallest value of $\text{diff}_i$, adjust $\text{diff}_i = \text{diff}_i + 1$ and $B_{total} = B_{total} + 1$ respectively, and repeat until $B_{total} = B_{target}$.

11. Allocate input energies, $\{\tilde{E}_i\}$, accordingly so that $P_e(i) = P_{e,i,target} \forall i$ given the bit allocation table $\{\bar{b}_i\}$, where $P_e(i)$ is the probability of error for the $i^{-th}$ used carrier and $P_{e,i,target}$ is the target probability of error for the $i^{-th}$ carrier.

12. Calculate the current total transmit energy, $E_{total}$, according to:

$$\epsilon_{total} = \sum_{i=0}^{N-1} \epsilon_i, \quad (19)$$

where $\tilde{E}_i$ is the current transmit energy used by the $i^{-th}$ carrier.

13. Scale final energy distribution, $\{\tilde{E}_i\}$, according to:

$$\epsilon_i = \min \left\{ \begin{array}{l} \frac{\epsilon_{target}}{\epsilon_{total}} \epsilon_i \\ \epsilon_{max,i} \end{array} \right\}, \quad (20)$$

The initial bit and energy allocation tables of this system are given by $\{\bar{b}_i\}$ and $\{\tilde{E}_i\}$, respectively.

The above-described processes for calculating the initial bit and energy allocation tables, therefore the initial system transmission bandwidth, may also be applied to a variable bandwidth, single-carrier system implemented with a Decision Feedback Equalizer (DFE) receiver or a Tomlinson precoder during the initialization process of such system. The optimal transmission bandwidth of such variable bandwidth, single-carrier system is accurately approximated by the optimal multicarrier transmission bandwidth calculated with the abovedescribed processes.

Figure 6:
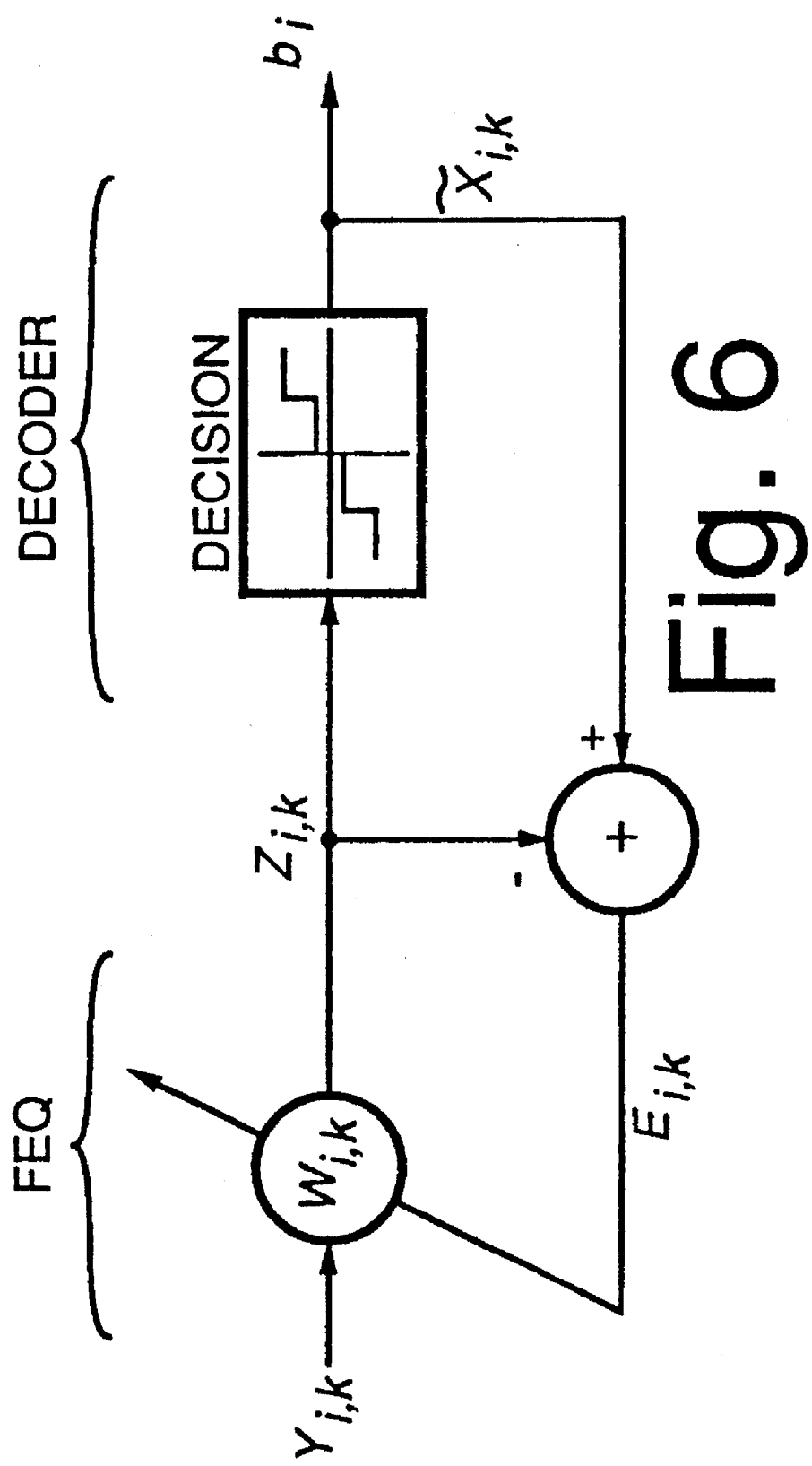
FIG. 6 is a schematic illustration of a one-tap frequency domain equalizer (FEQ) and associated decision element.
Figure 7:
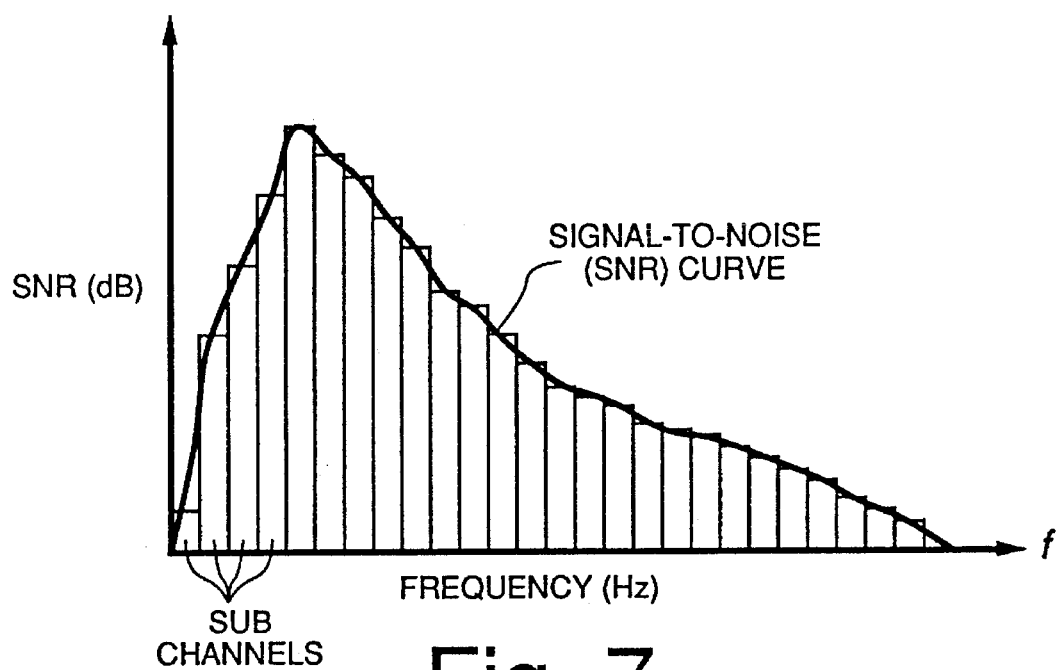
FIG. 7 illustrates DMT bit allocation in the frequency domain.
Figure 8:
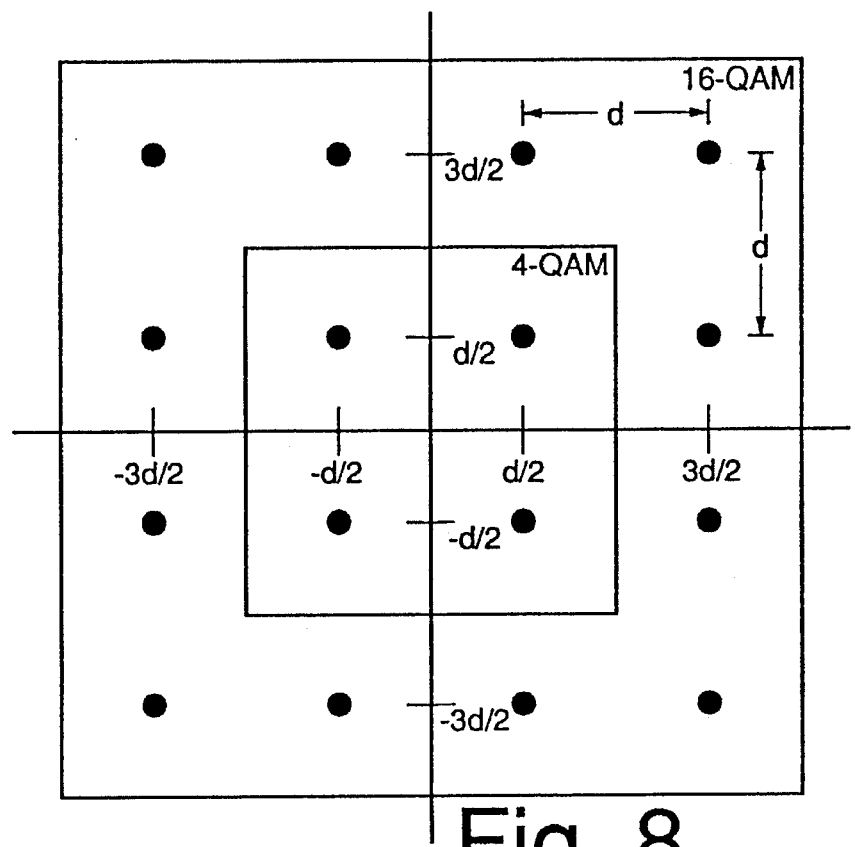
FIG. 8 illustrates two-dimensional 4 and 16 QAM signal constellations.
Figure 11:
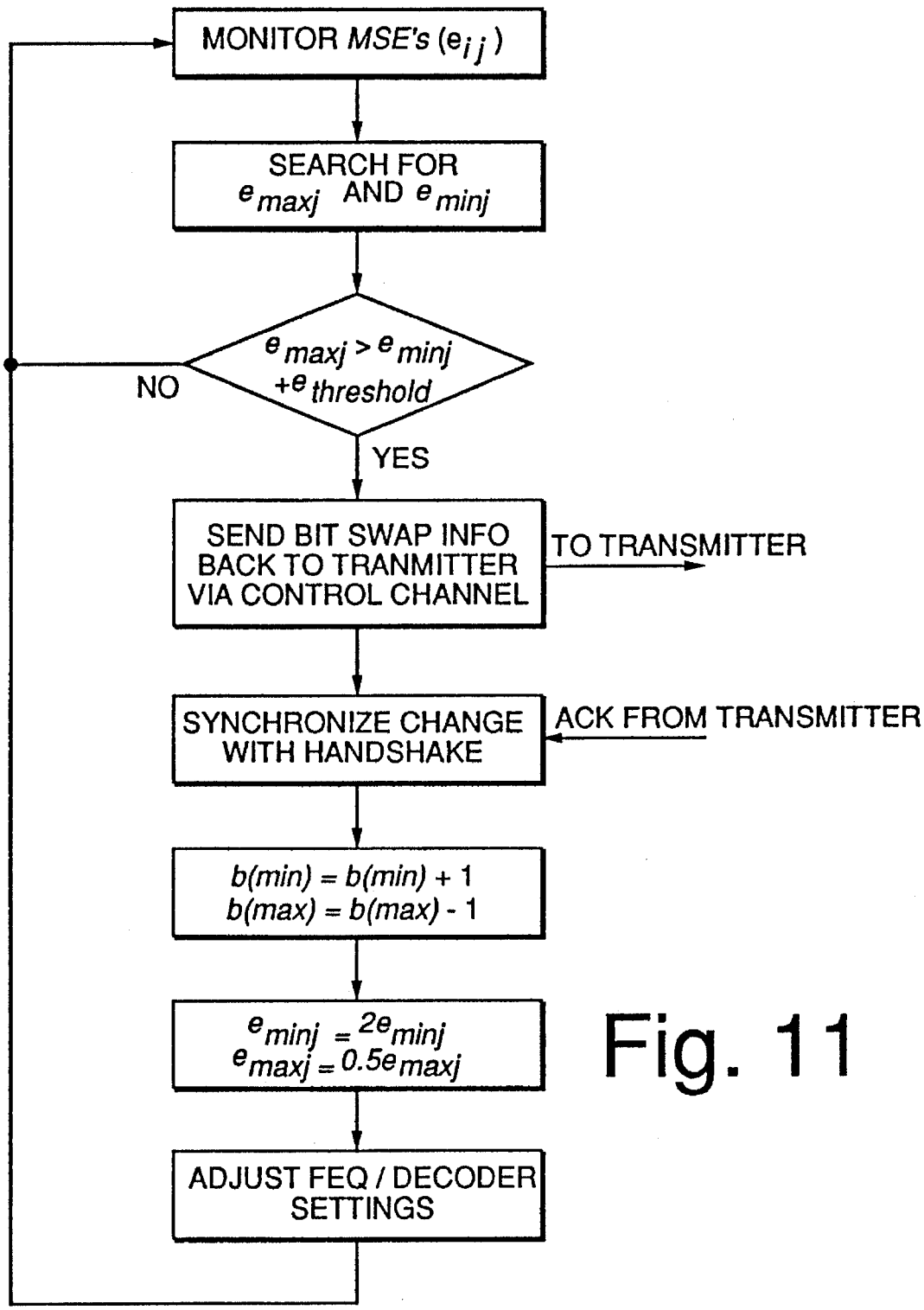
FIG. 11 is a flow chart depicting a bit swap algorithm in accordance with the present invention.

In many practical systems, the channel characteristics may be quasi-stationary and time-varying. For example, the frequency response of a Digital Subscriber Line may vary in time with temperature variations, and the noise characteristics may change in time with different numbers of active crosstalkers. As a result, the best transmission bandwidth and bit distribution identified during multicarrier system initialization may vary in time. Therefore, some real-time adaptive algorithm that can modify the system bit distribution and/or transmission bandwidth during normal system operation is necessary to maintain optimal system performance. The present invention includes an adaptive-update procedure that is effective in tracking channel variations for DSL applications. The key to this adaptive-update procedure is to keep track of the steady state MSE's, or SNR's, or SNR/Γ's of all used carriers in the multicarrier system in the background at the receiver during normal system operation, and when the MSE's, or SNR's, or SNR/Γ's of one carrier exceeds a predetermined threshold value, which is 3 dB worse than any other one carrier in the preferred embodiment, a bit is swapped from the worse carrier to a better carrier, so that the overall bit-error-rate is reduced. The preferred embodiment of this procedure is illustrated by the flow chart of FIG. 11 and can be summarized in the following steps:

1. Monitor steady state MSE's (or SNR's or SNR/Γ's) of all used carriers in the background at the receiver according to:

$$|E_{i,j}|^2 = R\{E_{i,j}^2\} + I\{E_{i,j}^2\} \quad (21)$$

$$\epsilon_{i,j} = (\lambda)\epsilon_{i,j-1} + (1-\lambda)|E_{i,j}|^2 \quad (22)$$

where $\{\tilde{E}_j\}$ is the error, or difference between the input and the output of the hard decision decoder (FIG. 6) at time j for the $i^{-th}$ carrier, and it is computed independently for the real ($R\{\tilde{E}_{ij}\}$) and the imaginary ($I\{\tilde{E}_{ij}\}$) dimensions for each carrier i. The cumulative error energy estimate for the $i^{-th}$ carrier at time j, $\epsilon_{ij}$, is then computed by averaging successive squared error magnitudes, where $\lambda$ is a positive fraction slightly less than 1. SNR, or SNR/Γ, normalization is included if that is the preferred transmission quality measure.

2. Search through all used carriers for $\epsilon_{maxj}$ and $\epsilon_{minj}$ in the background at the receiver, where $\epsilon_{maxj}$ is the maximum cumulative error energy estimate and $\epsilon_{minj}$ is the minimum cumulative error energy estimate at time j, respectively.

3. If $\epsilon_{maxj} > \epsilon_{minj} + \epsilon_{threshold}$ then go to step 4, otherwise return to step 1, where $\epsilon_{threshold}$ is the threshold value that needs to be exceeded before a bit swap operation can take place and in the preferred embodiment $\epsilon_{threshold} = 3$ (dB).

4. Send bit swap information back to transmitter via control channel.

Figure 12:
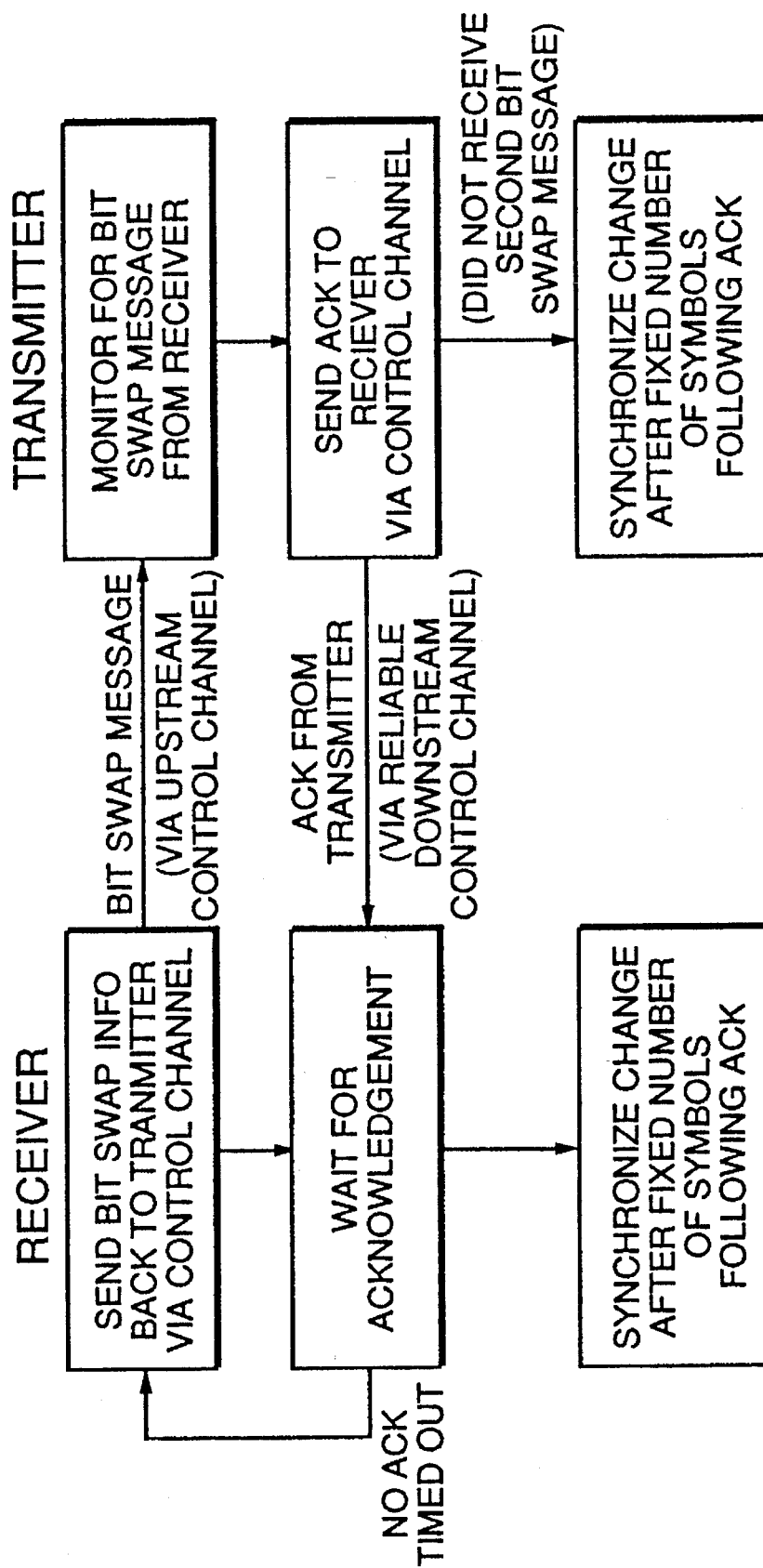
FIG. 12 is a block diagram illustrating a handshaking procedure in accordance with the present invention.

5. Synchronize change through a simple handshake procedure. A block diagram illustrating the procedure is shown in FIG. 12.

6. Let b(min)=b(min)+1 and b(max)=b(max)−1, where b(min) is the current number of bits assigned in the bit allocation table to the carrier with a cumulative error energy estimate of $\epsilon_{minj}$ and b(max) is the current number of bits assigned in the bit allocation table to the carrier with a cumulative error energy estimate of $\epsilon_{maxj}$.

7. Let $\epsilon_{minj} = 2\epsilon_{minj}$ and $\epsilon_{maxj} = 0.5\epsilon_{maxj}$.

8. Adjust decoder slicer settings for the two carriers involved in the bit swap operation accordingly.

This particular adaptive update algorithm can also be applied in conjunction with or in place of any initial bandwidth optimization algorithm for a multicarrier communication system.

The above described processes are physically implemented by software programs residing in custom hardware that may be embodied with multiple general purpose Digital Signal Processors (DSP) connected in a serial pipeline format plus additional Random Access Memory (RAM), multi-drop inter-processor communications bus, and other corresponding digital and analog components or with a custom Very Large Scale Integration (VLSI) design plus other corresponding digital and analog components. In particular, the actual software programs that implement the above-described processes are physically located in the corresponding DSP's that actualize the data bit buffer and encoder 36 in the transmitter, and the FEQ and decoder 58 in the receiver of the multicarrier communication system shown in FIG. 5.

Figure 13:
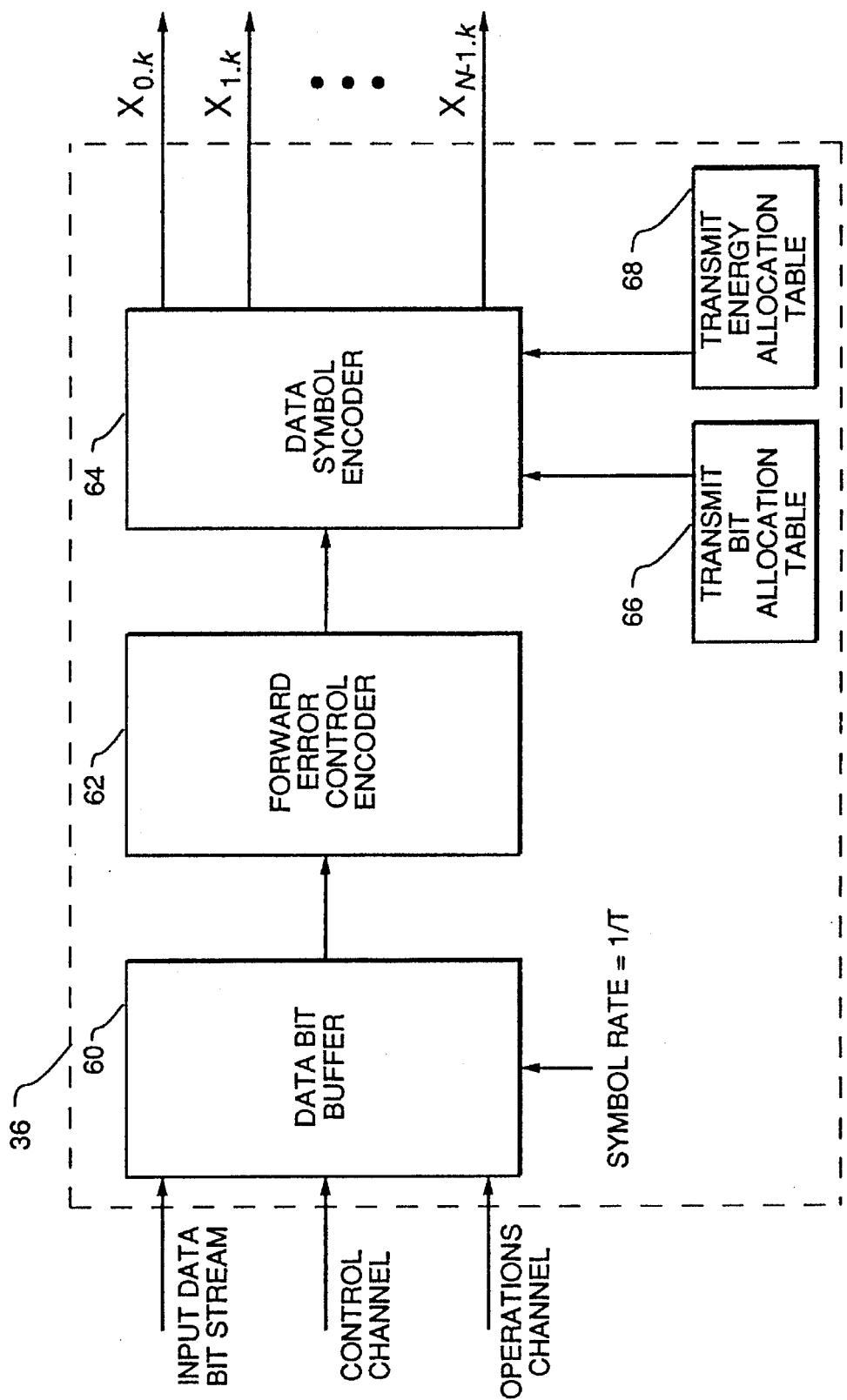
FIG. 13 is a block diagram showing the principal functional components used to implement the encoder 36 of FIG. 5b in accordance with the present invention.
Figure 14:
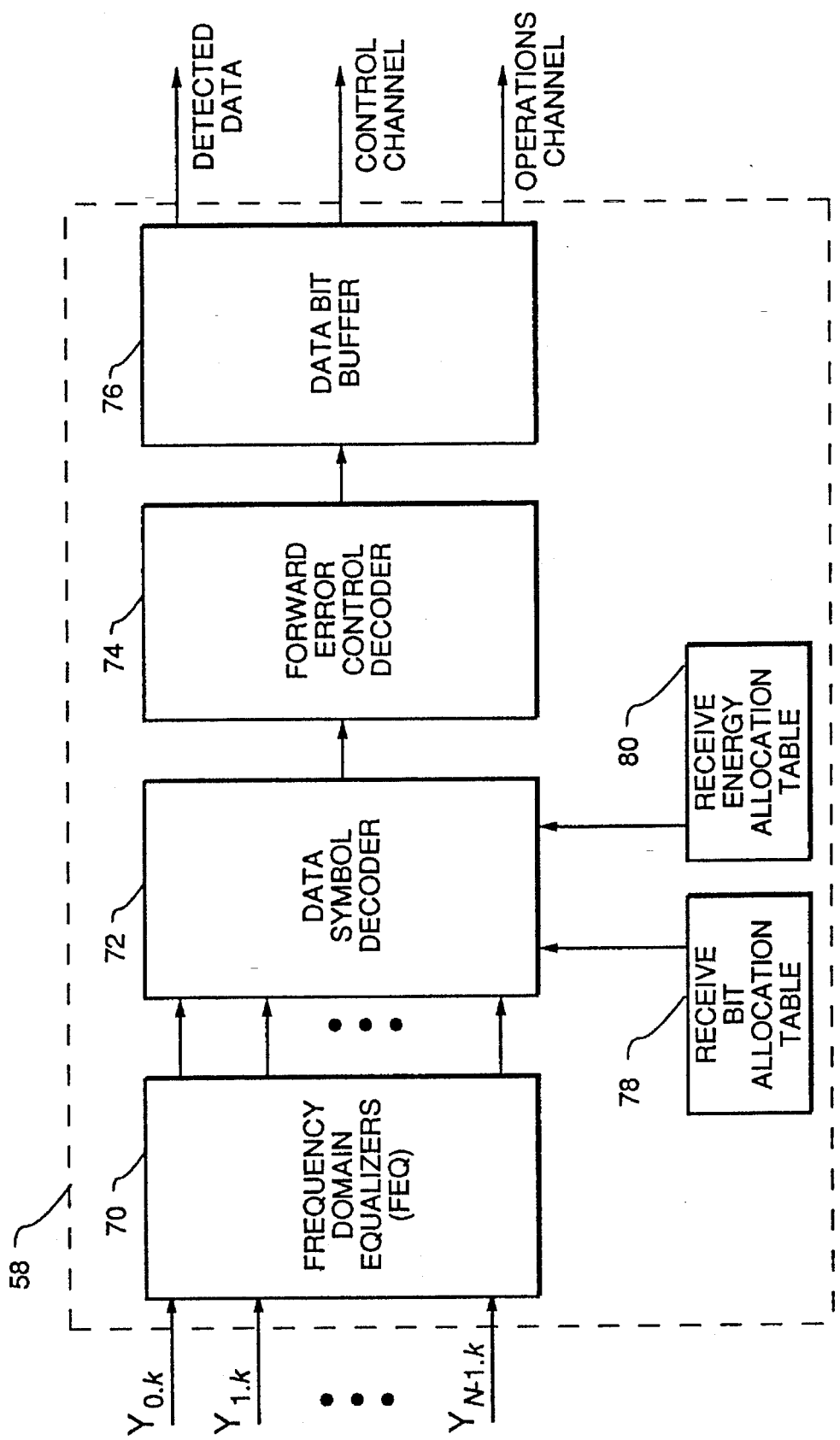
FIG. 14 is a block diagram showing the principal functional components used to implement the decoder 58 of FIG. 5b in accordance with the present invention.

More detailed block diagrams of the data bit buffer and encoder 36 and the FEQ and decoder 58 are shown in FIGS. 13 and 14, respectively, to which reference is now made. The initial bit and energy allocation tables are calculated at the receiver. These tables are stored in the receiver as the receive bit allocation table 78 and the receive energy allocation table 80, and these receiver tables are available to the data symbol decoder 72 during normal continuous system operation. These same tables are also reliably communicated back to the transmitter and stored therein as the transmit bit allocation table 66 and the transmit energy allocation table 68, and these transmitter tables are available to the data symbol encoder 64 during normal continuous system operation. The MSE estimates are obtained from the input and the output of the data symbol decoder 72 during normal continuous system operation, and the bit swap process is calculated continuously in the background at the receiver. With each complete bit swap process as described above, the transmit bit allocation table 66, the receive bit allocation table 78, and the settings of FEQ 70 are updated accordingly.

Although the present invention has been described above in terms of particular preferred embodiments, it is anticipated that after having read this disclosure various alterations, modifications, and alternative applications will become apparent to those skilled in the art. Accordingly, it is intended that the appended claims be interpreted as covering all such alterations and modifications, and all such additional and alternative applications as fall within the true spirit and scope of the invention.

What is claimed is:

1. In a multicarrier data transmission system that transmits data continuously over dispersive, noisy subscriber loops for digital service from a telephone central office to a user location and corresponding digital service between transmitters and receivers at said user location and said central office, a method for implementing variable transmission bandwidth as a function of line frequency-variable attenuation, noise power spectrum, a set of programmed and possibly variable carrier target bit-error-rates, and a programmed and possibly frequency-variable transmit power mask to improve data transmission speed or to improve performance margin at any given transmission speed subject to a power or power-spectral-density constraint, said method using subcarrier-indexed measurements of channel gains, channel noises, desired carrier bit-error-rates, and the programmed power mask to provide subcarrier-indexed estimates of transmission quality and to maintain the transmission quality at high levels, comprising the steps of:

(a) sorting the subcarrier-indexed estimates of the transmission quality, scaled by the desired subcarrier bit-error-rates, into an invertible ordering for assessment of the relative data-carrying capabilities of the subcarriers at initialization and/or during data transmission;

(b) calculating bit and energy allocation tables for said multicarrier data transmission system based on the sorted subcarrier-indexed estimates for either improving aggregate transmitted data rate at fixed performance margin with said power or power-spectral-density constraint or improving performance margin at a fixed data rate with said power or power-spectral-density constraint;

(c) communicating said bit and energy allocation tables between the transmitters and the receivers of said multicarrier transmission system; and (d) implementing said bit and energy allocation tables in coordination between the transmitters and the receivers during initialization of said multicarrier transmission system and/or during simultaneous transmission of said digital data by said multicarrier transmission system.

2. A multicarrier transmission system as recited in claim 1 and further comprising the steps of:

communicating changes in bit allocation by removing a single or several bits from those bits allocated to a carrier or subcarrier with a quality estimate below a specified threshold and placing that bit or bits on a second subcarrier or carriers with a quality estimate exceeding a second specified threshold; and coordinating the implementation of said changes in both the transmitters and the receivers by communication through a bi-directional overhead data channel, said overhead data channel being simultaneously present with the user data channel on the same communication line.

3. A multicarrier transmission system as recited in claim 1 and further comprising the steps of:

communicating the computed bit and energy allocation tables with reliable means of error detection or correction by redundantly transmitting said allocation tables on several subcarriers from the receivers to the transmitters; and coordinating the implementation of said allocation tables in both the transmitters and the receiver by communication through the communication line.

4. A multicarrier transmission system as recited in claim 1 and further comprising the steps of:

making subcarrier quality estimates through a computation of the average squared difference between an expected decision threshold on a subcarrier and the detected subcarrier signal level; and comparing said quality estimates to thresholds for each subcarrier to determine whether or not a particular bit allocation or gain allocation change is to be implemented.

5. A multicarrier transmission system as recited in claim 1 and further comprising the steps of:

making subcarrier quality estimates through the computation of an average signal-to-noise measure on a subcarrier; and comparing said quality estimates to thresholds for each subcarrier to determine whether or not a particular bit allocation or gain allocation change is to be implemented.

6. A multicarrier transmission system as recited in claim 1 and further comprising the steps of:

making subcarrier quality estimates through the computation of an average signal-to-noise ratio multiplied by a subcarrier dependent programmed reliability factor; and comparing said quality estimates to thresholds for each subcarrier to determine whether or not a particular bit allocation or gain allocation change is to be implemented.

7. A multicarrier transmission system as recited in claim 2 and further comprising the steps of:

communicating the computed bit and energy allocation tables with reliable means of error detection or correction by redundantly transmitting said allocation tables from the receivers to the transmitters; and coordinating the implementation of said allocation tables in both the transmitters and the receivers by communication through the communication line.

8. A multicarrier transmission system as recited in claim 1, 2, 3 or 7, and further comprising the steps of:

making subcarrier quality estimates through a computation of the average squared difference between an expected decision threshold on a subcarrier and the detected subcarrier signal level; and comparing said quality estimates to thresholds for each subcarrier to determine whether or not a particular bit allocation or gain allocation change is to be implemented.

9. A multicarrier transmission system as recited in claim 1, 2, 3 or 7, and further comprising the steps of:

making subcarrier quality estimates through the computation of an average signal-to-noise measure on a subcarrier; and comparing said quality estimates to thresholds for each subcarrier to determine whether or not a particular bit allocation or gain allocation change is to be implemented.

10. A multicarrier transmission system as recited in claim 1, 2, 3 or 7, and further comprising the steps of:

making subcarrier quality estimates through a computation of the average signal-to-noise ratio multiplied by a subcarrier dependent programmed reliability factor; and comparing said quality estimates to thresholds for each subcarrier to determine whether or not a particular bit allocation or gain allocation change is to be implemented.

11. A multicarrier communication system comprising: a transmitter means and a receiver means communicatively linked together by a datalink, the signal carrying characteristics of which are randomly variable, said transmitter means including, means for establishing a plurality of frequency domain subchannels for respectively communicating various quantities of data bits selected from a stream of data bits;

means for measuring the capability of the datalink to efficiently communicate the data bits in each said subchannel and for developing an optimum energy allocation and an optimum data bit allocation for each said subchannels; and means for causing an input data stream to be divided and modulated onto a plurality of frequency domain carriers, each corresponding to one of said subchannels for transmission over said datalink to said receiver means, the quantity of data bits transmitted over each said subchannel being selected as a function of said optimum data bit allocation; and said receiver means including, means for monitoring the quality of the transmission over each said subchannels; and means for returning an indication of the monitored quality to said transmitter means.

12. A multicarrier communication system as recited in claim 11 wherein said transmitter means further includes: means responsive to said indication of monitored quality and operative to change the data bit allocation among said subchannels to improve the quality of the transmission.

13. A multicarrier communication system as recited in claim 11 wherein said means for measuring is initialized for maximizing total data rate in accordance with the following steps:

a) computing SNR(i) $\forall$i, when all subcarriers are used and E(i)=1 $\forall$i, where
   SNR(i) is the SNR estimate of the $i^{-th}$ subcarrier at the receiver and
   E (i) is the transmit energy of the $i^{-th}$ subcarrier, normalized to 1;

b) calculating SNR (i) /$\Gamma$(i) , where
   $\Gamma$(i) is the "SNR gap" for the $i^{-th}$ subcarrier that is determined by the desired bit-error-rate, a system performance margin, a total effective coding gain, the Q-function, and the number of nearest neighbors in the input signal constellation for the $i^{-th}$ subcarrier;

c) sorting and storing the resulting SNR (i)/$\Gamma$(i)'s into descending order and labeling them so that SNR(j)/$\Gamma$(j)> SNR(j+1)/$\Gamma$(j+1) $\forall$j<N;

d) letting k=1, $b_{max}$=0, and initializing $\{\hat{b}_j\}$ to all zeros, where
   k is a count,
   $b_{max}$ is the current maximum number of bits achievable in a multicarrier symbol, and
   $\{\hat{b}_j\}$ is the current bit allocation table that achieves $b_{max}$;

e) computing $b_{target}(k)$ according to $$b_{target}(k) = \sum_{j=1}^{k} b_j,$$

where
$b_{target}(k)$ is the number of bits achievable in a multicarrier symbol using only the k best subcarriers, and the number of bits achievable by the $j^{-th}$ subcarrier $b_j$, is determined by:

$$b_j = \min\left\{ \text{round}\left\{ \log_2 \frac{\left(1 + \frac{\epsilon_{target}}{k} SNR(j)\right)}{\Gamma(j)} \right\}, \text{floor}\left\{ \log_2\left(1 + \frac{\epsilon_{max,j} SNR(j)}{\Gamma(j)}\right) \right\} \right\},$$

wherein, round{x} is the integer rounding operation; i.e., when the decimal part of x≥0.5, x is rounded up to the next larger integer value by the operation round{x} and when the decimal part of x<0.5, x is rounded down to the next smaller integer value no less than itself by the operation round{x}, floor{x} is the floor operation; i.e., x is always rounded down to the next smaller integer value no less than itself by the operation floor{x}, $E_{target}$ is the total input energy, or power, constraint at the transmitter, k is the number of used subcarriers, $\Gamma$(j) is the "SNR gap" of the chosen system parameters for the $j^{-th}$ subcarrier, and $E_{max,j}$ is the maximum energy, or power, allowable in the $j^{-th}$ subcarrier due to the transmit power mask;

for each of the k subcarriers used, an equal amount of transmit energy $E_{target}/k$ is used to calculate the achievable number of bits per multicarrier symbol, but in no event is such energy greater than the allowable amount of individual carrier transmit energy determined by the power mask;

f) if $b_{target}(k) > b_{max}$, then setting $b_{max} = b_{target}(k)$ and keeping track of the current bit allocation table, $\{\hat{b}_j\} = \{b_j\}$, that achieves $b_{max}$;

g) if k≠N, then setting k=k+1 and returning to step e, otherwise going to step h; at this point $b_{max}$ will indicate the maximum achievable data rate, and the currently stored bit allocation table that achieves $b_{max}$, $\{\hat{b}_j\}$, can be used to obtain the initial system bit allocation table, $\{\hat{b}_i\}$56 , since the mapping in step c is invertible;

h) allocating input energies, $\{\tilde{E}_i\}$, accordingly so that $P_e(i) = P_{e,i,target}$ $\forall$i given the bit allocation table $\{\hat{b}_i\}$, where
   $P_e(i)$ is the probability of error for the $i^{-th}$ used subcarrier and
   $P_{e,i,target}$ is the target probability of error for the $i^{-th}$ subcarrier;

i) calculating the current total transmit energy, $E_{total}$, according to $$\epsilon_{total} = \sum_{i=0}^{N-1} \epsilon_i,$$

where $E_i$ is the current transmit energy used by the $i^{-th}$ subcarrier;

j) scaling final energy distribution, $\{\tilde{E}_i\}$, according to $$\epsilon_i = \min \left\{ \begin{array}{c} \frac{\epsilon_{target}}{\epsilon_{total}} \epsilon_i \\ \epsilon_{max,i} \end{array} \right\}_j$$

and k) causing said transmitter means to allocate bits to each said subchannel according to the bit allocation table $\{\tilde{b}_i\}$) and to allocate transmitting power to each said subchannel in accordance with the distribution $\{\tilde{E}_i\}$.

14. A multicarrier communication system as recited in claim 11 wherein said means for measuring is initialized for maximizing system performance margins subject to a predetermined target rate in accordance with the following steps:

a) computing SNR(i) $\forall i$, when all subcarriers are used and E(i)=1 $\forall i$, where
   SNR(i) is the SNR estimate of the $i^{-th}$ subcarrier at the receiver, and
   E(i) is the transmit energy of the $i^{-th}$ subcarrier, normalized to 1;

b) sorting and storing the resulting SNR(i)'s into descending order and labeling them so that SNR(j)$\geq$SNR(j+1) $\forall j<N$;

c) letting k=1, $\gamma_{max}=\infty$, and count=0, where
   k is a count,
   $\gamma_{max}$ is the current maximum achievable system performance margin, and
   count is the number of subcarriers to use to achieve $\gamma_{max}$;

d) computing $\gamma(k)$ according to $$\gamma(k) = 10 \log_{10} \left( \frac{\overline{SNR(k)}}{2^{\frac{b_{target}}{k}} - 1} \right) + \gamma_{eff} - 9.8(dB)$$

where
$\gamma(k)$ is the maximum system performance margin achievable in a multicarrier symbol with a target data rate of $b_{target}$, a total effective coding gain of $\gamma_{eff}$, and a desired bit-error-rate of $10^{-7}$, using only the k best subcarriers, and the current geometric SNR, $\overline{SNR(k)}$, is calculated as $$\overline{SNR(k)} = \left[ \prod_{j=1}^{k} \epsilon_j SNR(j) \right]^{1/2}$$

where the current transmit energy used by the $j^{-th}$ subcarrier, $E_j$, is determined by $$\epsilon_j = \min \left\{ \begin{array}{c} \frac{\epsilon_{target}}{k} \\ \epsilon_{max,j} \end{array} \right\},$$

wherein,
$E_{target}$ is the total input energy, or power, constraint at the transmitter,
k is the number of used subcarriers, and
$E_{max,j}$ the maximum energy, or power, allowable in the $j^{-th}$ subcarrier due to the transmit power mask; for each of the k subcarriers used, an equal amount of transmit energy $E_{target}/k$ is used to calculate the current geometric SNR, $\overline{SNR(k)}$, but in no event is such energy greater than the allowable amount of individual carrier transmit energy due to the power mask;

e) if $\gamma(k)>\gamma_{max}$, then setting $\gamma_{max}=\gamma(k)$ and count=k;

f) if k$\neq$N, then setting k=k+1 and returning to step d, otherwise going to step g; at this point $\gamma_{max}$ will indicate the maximum achievable system performance margin given the set of system parameters, and count will be the corresponding number of best subcarriers to use to achieve $\gamma_{max}$;

g) calculating the initial bit allocation table, $\{\tilde{b}_i\}$, based on $\gamma_{max}$ and count according to $$b_j = \min \left\{ \begin{array}{l} \text{round} \left\{ \log_2(1 + \frac{\frac{\epsilon_{target}}{k} SNR(j)}{\Gamma_{max}}) \right\} \\ \text{floor} \left\{ \log_2 \left( 1 + \frac{\epsilon_{max,j} SNR(j)}{\Gamma_{max}} \right) \right\} \end{array} \right\},$$

for those used subcarriers determined by count and the invertible mapping of step b, keeping track of the amount of rounding, $\text{diff}_j$, by $$\text{diff}_j = \left\{ \begin{array}{ll} \text{diff}_i = 0.5 & \text{if } b_j = \text{floor} \left\{ \log_2 \left( 1 + \frac{\epsilon_{max,j} SNR(j)}{\Gamma_{max}} \right) \right\} \\ b_j - \log_2 \left( 1 + \frac{\frac{\epsilon_{target}}{k} SNR(j)}{\Gamma_{max}} \right) & \text{otherwise} \end{array} \right.$$

and $\Gamma_{max}$ is given by $$\Gamma_{max} = \left[ Q^{-1} \left( \frac{P_e}{N_e} \right) \right]^2 + \gamma_{max} - \gamma_{eff} - 4.77 \text{ (in } dB),$$

using $\gamma_{max}=\gamma_{margin}$;

h) letting $B_{total} = \Sigma_{i=0}^{N-1} \tilde{b}_i$,
   where $B_{total}$ is the total number of bits supported in a multicarrier symbol by the current bit allocation table $\{\tilde{b}_i\}$;

i) if $B_{total} > B_{target}$, then subtracting one bit at a time from the current bit table, $\{\tilde{b}_i\}$, on the subcarrier that presently has the largest value of $diff_i$, adjusting $diff_i = diff_i - 1$ and $B_{total} = B_{total} - 1$ respectively, and repeating until $B_{total} = B_{target}$;

j) if $B_{total} < B_{target}$, then adding one bit at a time to the current bit table, $\{\tilde{b}_i\}$, on the subcarrier that presently has the smallest value of $diff_i$, adjusting $diff_i = diff_i + 1$ and $B_{total} = B_{total} + 1$ respectively, and repeating until $B_{total} = B_{target}$;

k) allocating input energies, $\{\tilde{E}_i\}$, accordingly so that $P_e(i) = P_{e,i,target}$ $\forall i$ given the bit allocation table $\{\tilde{b}_i\}$, where
   $P_e(i)$ is the probability of error for the $i^{-th}$ used subcarrier, and
   $P_{e,i,target}$ is the target probability of error for the $i^{-th}$ subcarrier;

l) calculating the current total transmit energy, $E_{total}$, according to $$\epsilon_{total} = \sum_{i=0}^{N-1} \epsilon_i,$$

where $E_i$ is the current transmit energy used by the $i^{-th}$ subcarrier;

m) scaling the final energy distribution, $\{\tilde{E}_i\}$, according to $$\epsilon_i = \min \left\{ \frac{\epsilon_{target}}{\epsilon_{total}} \epsilon_i , \epsilon_{max,i} \right\},$$

and n) causing said transmitter means to allocate said bits to each said subchannel according to the bit allocation table $\{\tilde{b}_i\}$ and to allocate transmitting power to each said subchannel in accordance with the distribution $\{\tilde{E}_i\}$.

15. A multichannel communication system as recited in claim 12 wherein said transmitting means and said receiver means adaptively modify the system bit and/or transmission bandwidth during normal system operation in accordance with the following steps:

a) monitoring the steady state MSE's (or SNR's or SNR/Γ's) of all used subcarriers in the background at said receiver means according to $$|E_{ij}|^2 = R\{E_{ij}^2\} + I\{E_{ij}^2\}$$

$$\epsilon_{ij} = (\lambda)\epsilon_{ij-1} + (1-\lambda)|E_{ij}|^2$$

where $\{\tilde{E}_{ij}\}$ is the error, or difference between the input and the output of the hard decision decoder at time j for the $i^{-th}$ subcarrier, and it is computed independently for the real $(R\{\tilde{E}_{ij}\})$ and the imaginary $(I\{\tilde{E}_{ij}\})$ dimensions for each subcarrier i; the cumulative error energy estimate for the $i^{-th}$ subcarrier at time j, $\epsilon_{ij}$, is then computed by averaging successive squared error magnitudes, where $\lambda$ is a positive fraction slightly less than 1; SNR, or SNR/Γ, normalization is included if that is the preferred transmission quality measure;

b) searching through all used subcarriers for $\epsilon_{maxj}$ and $\epsilon_{minj}$ in the background at said receiver means, where $\epsilon_{maxj}$ is the maximum cumulative error energy estimate and $\epsilon_{minj}$ is the minimum cumulative error energy estimate at time j, respectively;

c) if $\epsilon_{maxj} > \epsilon_{minj} + \epsilon_{threshold}$ then going to step d, otherwise returning to step a,
   where $\epsilon_{threshold}$ is a predetermined threshold value that needs to be exceeded before a bit swap operation can take place;

d) sending bit swap information back to said transmitter means via the control channel;

e) synchronizing the change through a simple handshake procedure;

f) letting $b(min) = b(min) + 1$ and $b(max) = b(max) - 1$, where
   b(min) is the current number of bits assigned in the bit allocation table to the subcarrier with a cumulative error energy estimate of $\epsilon_{minj}$, and
   b(max) is the current number of bits assigned in the bit allocation table to the subcarrier with a cumulative error energy estimate of $\epsilon_{maxj}$;

g) letting $\epsilon_{minj} = 2\epsilon_{minj}$ and $\epsilon_{maxj} = 0.5\epsilon_{maxj}$; and h) adjusting the decoder slicer settings in said transmitter means for the two subcarriers involved in the bit swap operation accordingly.

16. In a multicarrier transmission system having transmitters and receivers to transmit and receive data continuously over communication lines, a method for implementing variable bandwidth data transmission with a plurality of subcarriers as a function of measured signal-to-noise ratios of the subcarriers, comprising the steps of:

calculating signal-to-noise factors for the subcarriers as functions of the measured signal-to-noise ratios of the subcarriers to a signal-to-noise gap approximation of the subcarriers, said gap approximation being a function of a system performance margin;

sorting the calculated signal-to-noise factors;

computing a plurality of bit allocation tables for the subcarriers using the first k subcarriers as provided in the order of the sorted factors and where k increases from one to the number of subcarriers;

determining bit allocation to the subcarriers by selecting from the plurality of bit allocation tables the table with the highest bit allocation to the subcarriers;

calculating energy allocation to each of the subcarriers according to its bit allocation; and implementing said calculated bit allocation and energy allocation to the subcarriers in the transmission of data to optimize data transmission speed during initialization of said multicarrier transmission system and/or during simultaneous transmission of said data by said multicarrier transmission system.

17. In a multicarrier transmission system as recited in claim 16 wherein the calculating energy allocation step includes the substeps of:

calculating preliminary energy allocation to each of the subcarriers according to its bit allocation such that a probability-of-error for each of the subcarriers equals to a target probability of error for each of the subcarriers;

determining the energy allocation to each of the subcarriers by finding the smaller of a proportional preliminary energy allocation value and a maximum subcarrier energy value, said proportional preliminary energy allocation value being a function of the total preliminary energy allocation to the subcarriers, an energy constraint, and the preliminary energy allocation to each of the subcarriers.

18. In a multicarrier transmission system as recited in claim 17 further including the steps of:

measuring subcarrier transmission quality estimates through the computation of an average squared difference between an expected decision threshold on a subcarrier and the detected subcarrier signal level; and comparing said quality estimates to threshold values for the subcarriers to determine whether bit swapping from the subcarriers with worse quality estimates to subcarriers with better quality estimates is to be implemented.

19. In a multicarrier transmission system as recited in claim 17 further including the steps of:

measuring subcarrier transmission quality estimates through the computation of the average signal-to-noise ratios on the subcarriers; and comparing said quality estimates to threshold values for the subcarriers to determine whether bit swapping from the subcarriers with worse quality estimates to subcarriers with better quality estimates is to be implemented.

20. In a multicarrier transmission system as recited in claim 17 further including the steps of:

measuring subcarrier transmission quality estimates through the computation of the average signal-to-noise ratios multiplied by a subcarrier dependent programmed reliability factor; and comparing said quality estimates to threshold values for the subcarriers to determine whether bit swapping from the subcarriers with worse quality estimates to subcarriers with better quality estimates is to be implemented.

21. In a multicarrier transmission system as recited in claim 16 wherein the calculating energy allocation step includes the substeps of:

calculating preliminary energy allocation to each of the subcarriers according to its bit allocation such that a probability-of-error for each of the subcarriers equals to a target probability of error for each of the subcarriers; and determining the energy allocation to each of the subcarriers by finding the smaller of a proportional preliminary energy allocation value and a maximum subcarrier energy value, said proportional preliminary energy allocation value being a function of the total preliminary energy allocation to the subcarriers, an energy constraint, and the preliminary energy allocation to each of the subcarriers.

22. In a multicarrier transmission system as recited in claim 16 further including the steps of:

measuring subcarrier transmission quality estimates through the computation of an average squared difference between an expected decision threshold on a subcarrier and the detected subcarrier signal level; and comparing said quality estimates to threshold values for the subcarriers to determine whether bit swapping from the subcarriers with worse quality estimates to subcarriers with better quality estimates is to be implemented.

23. In a multicarrier transmission system as recited in claim 16 further including the steps of:

measuring subcarrier transmission quality estimates through the computation of the average signal-to-noise ratios on the subcarriers; and comparing said quality estimates to threshold values for the subcarriers to determine whether bit swapping from the subcarriers with worse quality estimates to subcarriers with better quality estimates is to be implemented.

24. In a multicarrier transmission system as recited in claim 16 further including the steps of:

measuring subcarrier transmission quality estimates through the computation of the average signal-to-noise ratios multiplied by a subcarrier dependent programmed reliability factor; and comparing said quality estimates to threshold values for the subcarriers to determine whether bit swapping from the subcarriers with worse quality estimates to subcarriers with better quality estimates is to be implemented.

25. In a multicarrier transmission system having transmitters and receivers to transmit and receive data continuously over communication lines, a method for implementing variable bandwidth data transmission with a plurality of subcarriers and as a function of measured signal-to-noise ratios of the subcarriers, comprising the steps of:

sorting the signal-to-noise ratios of the subcarriers;

computing preliminary system performance margins using the subcarriers in the order of the sorted ratios, the preliminary subsystem performance margins being a function of the signal-to-noise ratios, the number of subcarriers, a target data rate, a total effective coding gain, a desired bit-error-rate, and energy for the subcarriers;

selecting the maximum system performance margin from said computed preliminary system performance margins;

calculating bit allocations to the subcarriers using said maximum system performance margin;

calculating energy allocation to the subcarriers according to its bit allocation; and implementing said calculated bit allocation and energy allocation to the subcarriers in the transmission of data to optimize data transmission speed during initialization of said multicarrier transmission system and/or during simultaneous transmission of said data by said multicarrier transmission system.

26. In a multicarrier transmission system as recited in claim 25 wherein the calculating bit allocation step includes the substeps of:

calculating a preliminary bit allocation table using the system performance margin; and determining the bit allocations to the subcarriers from the preliminary bit allocation table by comparing the total number of bits in the preliminary bit allocating table with the target data rate to determine whether bits should be added or removed from the preliminary bit allocation table.

27. In a multicarrier transmission system as recited in claim 26 wherein the calculating energy allocation step includes the substeps of:

calculating preliminary energy allocation to each of the subcarriers according to its bit allocation such that a probability-of-error for each of the subcarriers equals to a target probability of error for each of the subcarriers;

determining the energy allocation to each of the subcarriers by finding the smaller of a proportional preliminary energy allocation value and a maximum subcarrier energy value, said proportional preliminary energy allocation value being a function of the total preliminary energy allocation to the subcarriers, an energy constraint, and the preliminary energy allocation to each of the subcarriers.

28. In a multicarrier transmission system as recited in claim 27 further including the steps of:

measuring subcarrier transmission quality estimates through the computation of an average squared difference between an expected decision threshold on a subcarrier and the detected subcarrier signal level; and comparing said quality estimates to threshold values for the subcarriers to determine whether bit swapping from the subcarriers with worse quality estimates to subcarriers with better quality estimates is to be implemented.

29. In a multicarrier transmission system as recited in claim 27 further including the steps of:

measuring subcarrier transmission quality estimates through the computation of the average signal-to-noise ratios on the subcarriers; and comparing said quality estimates to threshold values for the subcarriers to determine whether bit swapping from the subcarriers with worse quality estimates to subcarriers with better quality estimates is to be implemented.

30. In a multicarrier transmission system as recited in claim 27 further including the steps of:

measuring subcarrier transmission quality estimates through the computation of the average signal-to-noise ratios multiplied by a subcarrier dependent programmed reliability factor; and comparing said quality estimates to threshold values for the subcarriers to determine whether bit swapping from the subcarriers with worse quality estimates to subcarriers with better quality estimates is to be implemented.

31. In a multicarrier transmission system as recited in claim 25 wherein the calculating bit allocation step includes the substeps of:

calculating a preliminary bit allocation table using the system performance margin; and determining the bit allocations to the subcarriers from the preliminary bit allocation table by comparing the total number of bits in the preliminary bit allocating table with the target data rate to determine whether bits should be added or removed from the preliminary bit allocation table.

32. In a multicarrier transmission system as recited in claim 25 wherein the calculating energy allocation step includes the substeps of:

calculating preliminary energy allocation to each of the subcarriers according to its bit allocation such that a probability-of-error for each of the subcarriers equals to a target probability of error for each of the subcarriers; and determining the energy allocation to each of the subcarriers by finding the smaller of a proportional preliminary energy allocation value and a maximum subcarrier energy value, said proportional preliminary energy allocation value being a function of the total preliminary energy allocation to the subcarriers, an energy constraint, and the preliminary energy allocation to each of the subcarriers.

33. In a multicarrier transmission system as recited in claim 25 further including the steps of:

measuring subcarrier transmission quality estimates through the computation of an average squared difference between an expected decision threshold on a subcarrier and the detected subcarrier signal level; and comparing said quality estimates to threshold values for the subcarriers to determine whether bit swapping from the subcarriers with worse quality estimates to subcarriers with better quality estimates is to be implemented.

34. In a multicarrier transmission system as recited in claim 25 further including the steps of:

measuring subcarrier transmission quality estimates through the computation of the average signal-to-noise ratios on the subcarriers; and comparing said quality estimates to threshold values for the subcarriers to determine whether bit swapping from the subcarriers with worse quality estimates to subcarriers with better quality estimates is to be implemented.

35. In a multicarrier transmission system as recited in claim 25 further including the steps of:

measuring subcarrier transmission quality estimates through the computation of the average signal-to-noise ratios multiplied by a subcarrier dependent programmed reliability factor; and comparing said quality estimates to threshold values for the subcarriers to determine whether bit swapping from the subcarriers with worse quality estimates to subcarriers with better quality estimates is to be implemented.

* * * * *